(12) United States Patent
 Garrett

(10) Patent No.: US 10,703,396 B1
(45) Date of Patent: Jul. 7, 2020

(54) BEVERAGE KEG DOLLY SYSTEM AND METHOD

(71) Applicant: Nathan Israel Garrett, Highland Village, TX (US)

(72) Inventor: Nathan Israel Garrett, Highland Village, TX (US)

( * ) Notice: Subject to any disclaimer, the term of this patent is extended or adjusted under 35 U.S.C. 154(b) by 0 days.

(21) Appl. No.: 16/429,624

(22) Filed: Jun. 3, 2019

(51) Int. Cl.
| *B62B 1/10* | (2006.01) |
| *B62B 1/26* | (2006.01) |
| *B62B 3/12* | (2006.01) |
| *B62B 3/10* | (2006.01) |
| *B62B 3/06* | (2006.01) |

(52) U.S. Cl.
 CPC .............. *B62B 1/10* (2013.01); *B62B 1/264* (2013.01); *B62B 3/0606* (2013.01); *B62B 3/104* (2013.01); *B62B 3/12* (2013.01)

(58) Field of Classification Search
 CPC .... B62B 1/10; B62B 1/14; B62B 1/16; B62B 1/264; B62B 3/0606; B62B 3/104; B62B 3/12
 See application file for complete search history.

(56) References Cited

U.S. PATENT DOCUMENTS

| 1,423,234 | A | * | 7/1922 | Lynch | B62B 1/264 |
| | | | | | 414/455 |
| 2,250,577 | A | * | 7/1941 | Ernst | B62B 3/104 |
| | | | | | 414/622 |
| 2,477,294 | A | * | 7/1949 | Fuller | B62B 3/12 |
| | | | | | 414/448 |
| 2,514,825 | A | * | 7/1950 | Edward | B62B 3/12 |
| | | | | | 187/231 |
| 2,598,168 | A | * | 5/1952 | Benjamin | B62B 3/12 |
| | | | | | 280/641 |
| 2,605,117 | A | * | 7/1952 | Benjamin | B62B 3/12 |
| | | | | | 280/43 |
| 2,612,386 | A | * | 9/1952 | Schutzer | B62B 1/264 |
| | | | | | 280/43.24 |
| 2,654,493 | A | * | 10/1953 | Kernkamp | F17C 13/085 |
| | | | | | 414/448 |
| 2,784,856 | A | * | 3/1957 | Jordan | B62B 1/264 |
| | | | | | 414/456 |
| 2,785,906 | A | * | 3/1957 | Matter | B62B 5/0438 |
| | | | | | 280/33.994 |
| 2,859,975 | A | * | 11/1958 | Weaver | B62B 3/001 |
| | | | | | 280/47.11 |

(Continued)

*Primary Examiner* — Erez Gurari
(74) *Attorney, Agent, or Firm* — Kevin Mark Klughart

(57) ABSTRACT

A beverage keg dolly (BKD) system/method providing for transportation of a beverage keg (BK) in tight quarters is disclosed. The system/method integrates a dolly frame spine (DFS), axial wheel assembly (AWA), radial wheel assembly (RWA), keg alignment handle (KAH), keg engagement hook (KEH), beverage keg cradle (BKC), and vertical rotation handle (VRH). BK transportation uses the KAH to engage/ cradle the KEH to a BK within the BKC. Once cradled by the BKC, the BK is lifted off the ground and supported by the AWA via depression of the VRH. The BK axially rotates about the AWA by the VRH until the BK center of gravity transitions a vertical equipoise plane (VEP) extending from the AWA. The weight of the BK is then supported by the AWA and the RWA. Transportation and/or circular rotation of the BK may then be affected by rotation/movement of the VRH.

20 Claims, 40 Drawing Sheets

(56) References Cited

U.S. PATENT DOCUMENTS

| | | | | | |
|---|---|---|---|---|---|
| 3,278,218 | A | * | 10/1966 | Jean-Pierre | B62B 3/104 294/81.2 |
| 3,760,964 | A | * | 9/1973 | Trapp | B62B 3/104 414/458 |
| 5,088,751 | A | * | 2/1992 | Zint | B62B 3/104 280/47.34 |
| 5,180,179 | A | * | 1/1993 | Salvucci | B62B 1/264 16/422 |
| 5,244,221 | A | * | 9/1993 | Ward | B62B 1/002 269/17 |
| 5,375,673 | A | * | 12/1994 | McCall | B62B 3/12 180/13 |
| 5,489,183 | A | * | 2/1996 | Malden | B62B 1/264 280/47.28 |
| 5,848,668 | A | * | 12/1998 | Kafrissen | B62B 3/12 187/231 |
| 5,868,407 | A | * | 2/1999 | Roese | B62B 3/001 280/47.34 |
| 5,931,483 | A | * | 8/1999 | Haynes | B62B 1/12 280/47.19 |
| 6,224,071 | B1 | * | 5/2001 | Dummer | B62B 3/104 280/47.2 |
| 7,273,216 | B1 | * | 9/2007 | Hohrman | B62B 1/264 280/47.26 |
| 7,651,104 | B1 | * | 1/2010 | Hilt | B62B 3/104 280/35 |
| 8,864,163 | B1 | * | 10/2014 | Buvala | B62B 3/10 280/476.1 |
| D798,001 | S | * | 9/2017 | Seeds | A01K 1/01 D30/161 |
| 2002/0187027 | A1 | * | 12/2002 | Colini | B62B 1/264 414/444 |
| 2002/0187028 | A1 | * | 12/2002 | Colini | B62B 1/264 414/444 |
| 2003/0025050 | A1 | * | 2/2003 | Brake | B62B 1/264 248/154 |
| 2003/0094778 | A1 | * | 5/2003 | Hungerbuhler | B62B 1/002 280/47.131 |
| 2004/0076501 | A1 | * | 4/2004 | McGill | B66F 9/082 414/607 |
| 2004/0265104 | A1 | * | 12/2004 | Davis, Jr. | B62B 1/264 414/490 |
| 2006/0071435 | A1 | * | 4/2006 | Zwack | B63C 11/02 280/47.27 |
| 2007/0114739 | A1 | * | 5/2007 | Simmons | B62B 1/264 280/47.27 |
| 2008/0185803 | A1 | * | 8/2008 | Analbers | B62B 1/10 280/47.34 |
| 2009/0014979 | A1 | * | 1/2009 | Snook | B62B 1/264 280/200 |
| 2009/0038864 | A1 | * | 2/2009 | Yun | B62B 3/12 180/19.1 |
| 2011/0304125 | A1 | * | 12/2011 | Ravnborg | B62B 3/027 280/651 |
| 2017/0232986 | A1 | * | 8/2017 | Root, Jr. | B62B 1/264 280/47.24 |
| 2018/0022370 | A1 | * | 1/2018 | Bowen | B62B 1/14 280/47.17 |
| 2018/0194382 | A1 | * | 7/2018 | Gong | B62P 3/022 |
| 2019/0092210 | A1 | * | 3/2019 | Marcusen | B60P 3/055 |
| 2019/0092587 | A1 | * | 3/2019 | Orsini | B62B 1/12 |
| 2019/0315383 | A1 | * | 10/2019 | Wang | B62B 3/02 |

* cited by examiner

2500

3000

3200

*Prior Art*

*Prior Art*

*Prior Art*

*Prior Art*

*Prior Art*

*Prior Art*

*Prior Art*

BEVERAGE KEG DOLLY SYSTEM AND METHOD

CROSS REFERENCE TO RELATED APPLICATIONS

Not Applicable

PARTIAL WAIVER OF COPYRIGHT

All of the material in this patent application is subject to copyright protection under the copyright laws of the United States and of other countries. As of the first effective filing date of the present application, this material is protected as unpublished material.

However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO A MICROFICHE APPENDIX

Not Applicable

FIELD OF THE INVENTION

The present invention relates to the transportation of beverage canisters. More particularly, the present invention relates to the transportation of beverage kegs in tight quarters such as may be encountered in bars and restaurants.

BACKGROUND AND PRIOR ART

Beverage containers such as beverage kegs are commonly used to transport a variety of beverages to bars, restaurants, and other establishments. A standard U.S. half-barrel keg is 23.3 inches high, 16.1-17.15627 inches in diameter, weighs 29.7 pounds (13.5 kg) empty, holds 130.8 pounds (59.3 kg) of beverage, and weighs 160.5 pounds (72.8 kg) when fully loaded with beverage.

The significant weight of a fully loaded beverage keg (>150 lbs) creates a significant risk of back injury to employees of bars, restaurants, and other establishments in that transporting these kegs in tight quarters such as off of trucks, behind bars, through doors, and other obstacles must be done manually as it cannot be accomplished using conventional hand trucks as these devices cannot be maneuvered in these tight quarters. As a result, employees of these establishments often attempt to lift the kegs and injure themselves due to the significant weight of the beverage keg. As such, there is a long felt need in the restaurant industry for a keg dolly (and more specifically a beverage keg dolly) that can be maneuvered in tight quarters and which will allow transportation of kegs without the need for lifting of the beverage keg by an employee.

BRIEF SUMMARY OF THE INVENTION

The present invention solves the long felt need for beverage keg (BK) transportation in tight quarters situations as follows. The present invention provides for beverage keg dolly (BKD) that provides for engagement (hooking) and cradling of the BK without the need for human lifting of the BK. Once the BK is hooked and cradled by the BKD, an axial wheel assembly (AWA) engages the ground and allows the BK to be lifted off the ground by depressing a vertical rotation handle (VRH). The BK is rotated about the AWA by depression of the VRH until the BK center of gravity passes through a vertical equipoise plane (VEP) associated with the AWA. At this point the weight of the BK transitions from solely being supported by the AWA to being supported by the AWA and a radial wheel assembly (RWA) that acts as a third point of vertical support for the BK. Once supported by the AWA and RWA, the BK is axially stable about the AWA and may be transported by manipulating the VRH. The VRH is positioned within a tight radius of the cylindrical axis of the BK such that it does not significantly increase the footprint of the BK as the BKD transports the BK. Rotation of the VRH allows the BK/BKD combination to easily rotate about any vertical axis and also be pushed/pulled/oriented within tight quarters having a maneuvering area approximately twice the top surface area consumed by the BK.

BRIEF DESCRIPTION OF THE DRAWINGS

For a fuller understanding of the advantages provided by the invention, reference should be made to the following detailed description together with the accompanying drawings wherein.

DESCRIPTION OF THE PRESENTLY PREFERRED EXEMPLARY EMBODIMENTS

Figure 1:
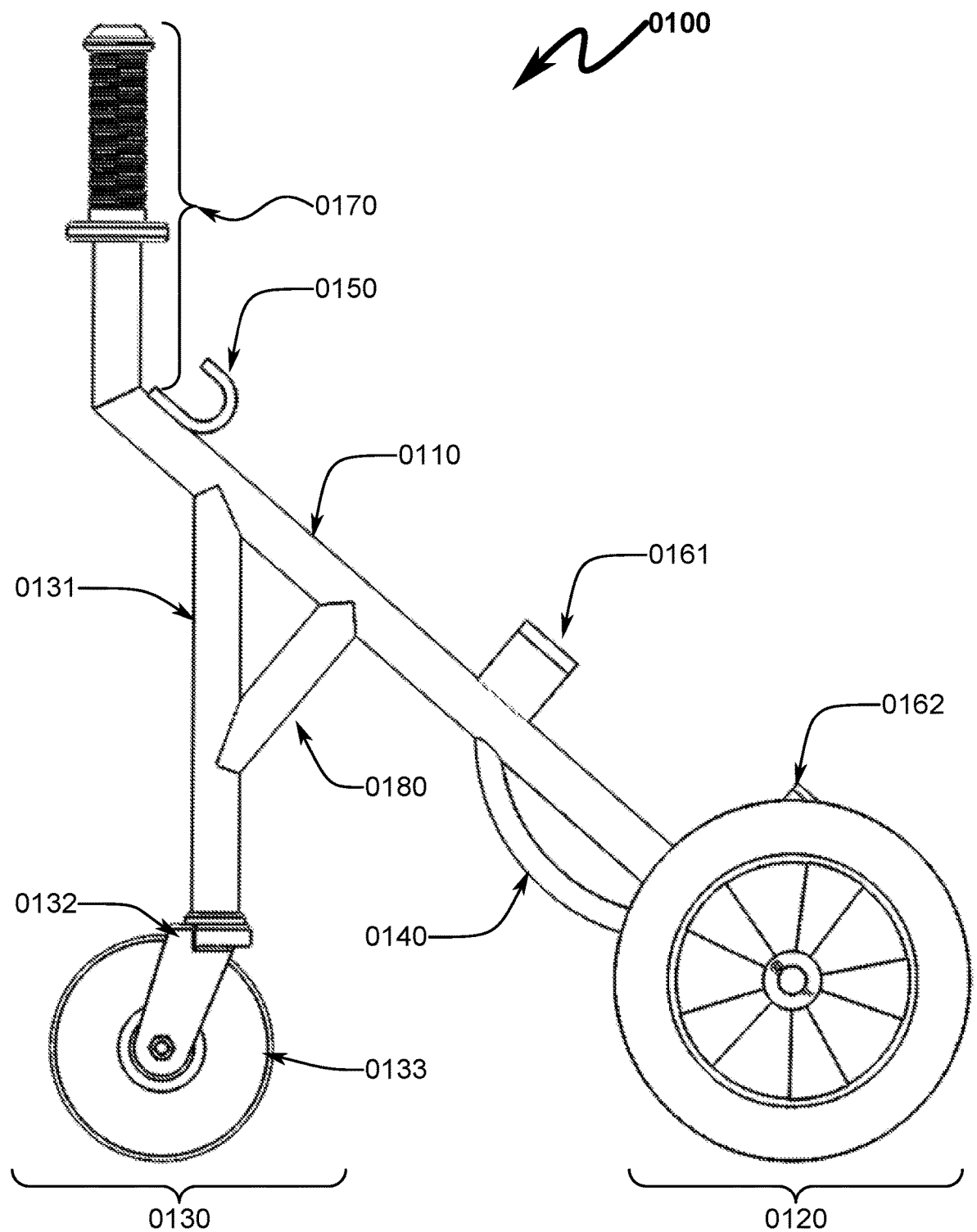
FIG. 1 illustrates a left side view of a preferred exemplary invention embodiment.

While this invention is susceptible of embodiment in many different forms, there is shown in the drawings and will herein be described in detailed preferred embodiment of the invention with the understanding that the present disclosure is to be considered as an exemplification of the principles of the invention and is not intended to limit the broad aspect of the invention to the embodiment illustrated.

The numerous innovative teachings of the present application will be described with particular reference to the presently preferred embodiment, wherein these innovative teachings are advantageously applied to the particular problems of a BEVERAGE KEG DOLLY SYSTEM AND METHOD. However, it should be understood that this embodiment is only one example of the many advantageous uses of the innovative teachings herein. In general, statements made in the specification of the present application do not necessarily limit any of the various claimed inventions. Moreover, some statements may apply to some inventive features but not to others.

Materials not Limitive

While preferred materials for elements of the present invention will herein be described, the present invention is not limited by these materials. Specifically, the use of steel or aluminum for construction of the BKD does not limit the construction to these materials.

Construction not Limitive

Various preferred exemplary embodiments are illustrated herein to teach the present invention. However, elements and features of each preferred exemplary embodiment may be combined with other depicted (and non-depicted) preferred exemplary embodiments to produce other preferred exemplary embodiments that may or may not be illustrated herein. Thus, the features depicted herein may be combined with others to form a wide variety of preferred exemplary embodiments as will be well understood by one skilled in the art.

Dimensions not Limitive

The present invention will be presented herein schematically in general terms. Specific sizes and dimensions as shown are only illustrative and do not limit the scope of the claimed invention. Specific relative sizes of various elements are shown for clarity and may not represent actual construction techniques used when reducing the invention to practice.

System Overview (0100)-(1600)

Figure 16:
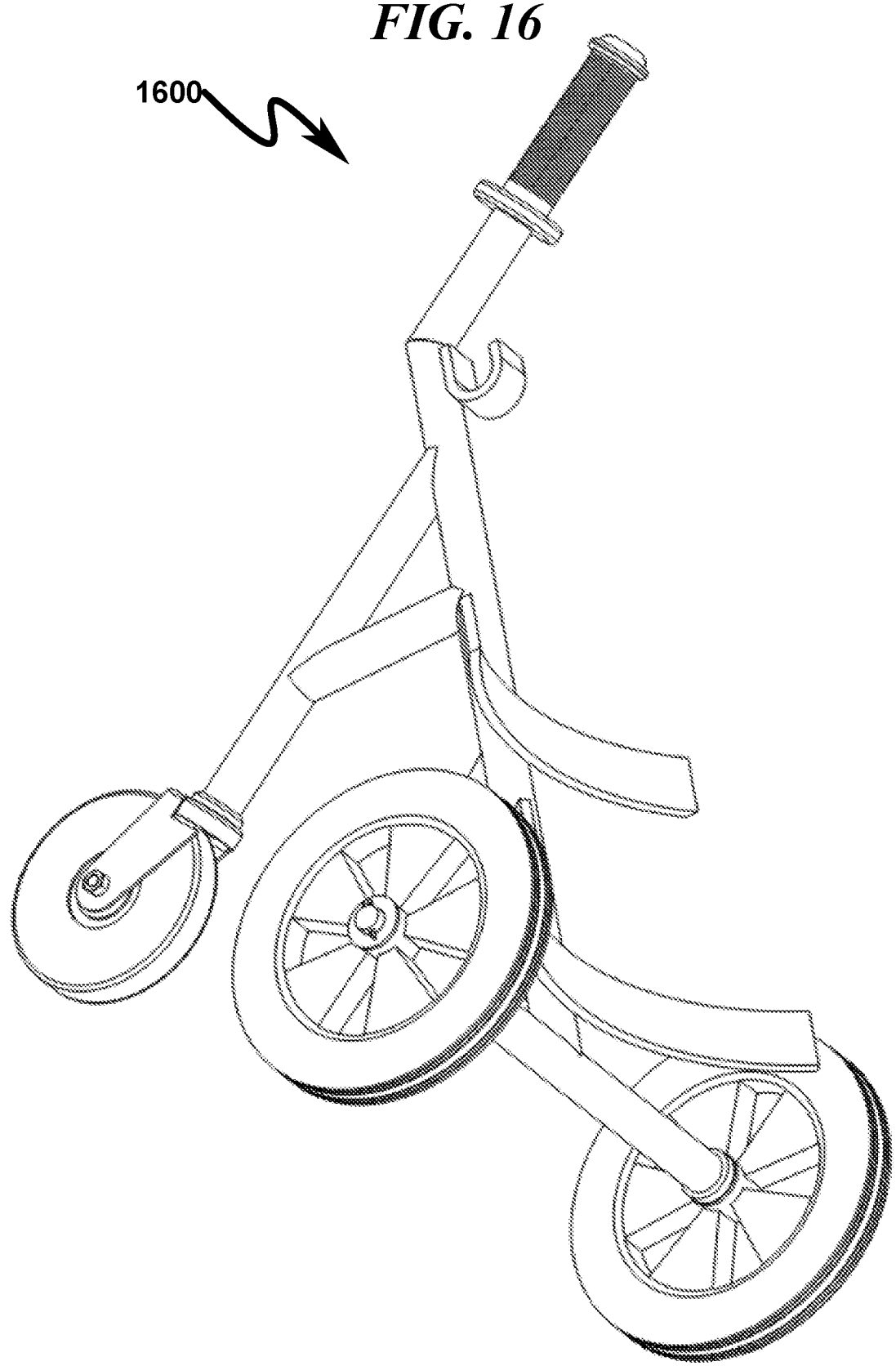
FIG. 16 illustrates a left front bottom perspective view of a preferred exemplary invention embodiment.

A preferred invention system embodiment is generally depicted in FIG. 1 (0100)-FIG. 16 (1600). The system consists of a dolly frame spine (DFS) (0110, 0210), axial wheel assembly (AWA) (0120, 0220), radial wheel assembly (RWA) (0130, 0230), keg alignment handle (KAH) (0140, 0240), keg engagement hook (KEH) (0150, 0250), beverage keg cradle (BKC) (0161, 0162, 0261, 0262), and vertical rotation handle (VRH) (0170, 0270), and an optional radial wheel stabilizer (RWS) (0180, 0280).

Figure 2:
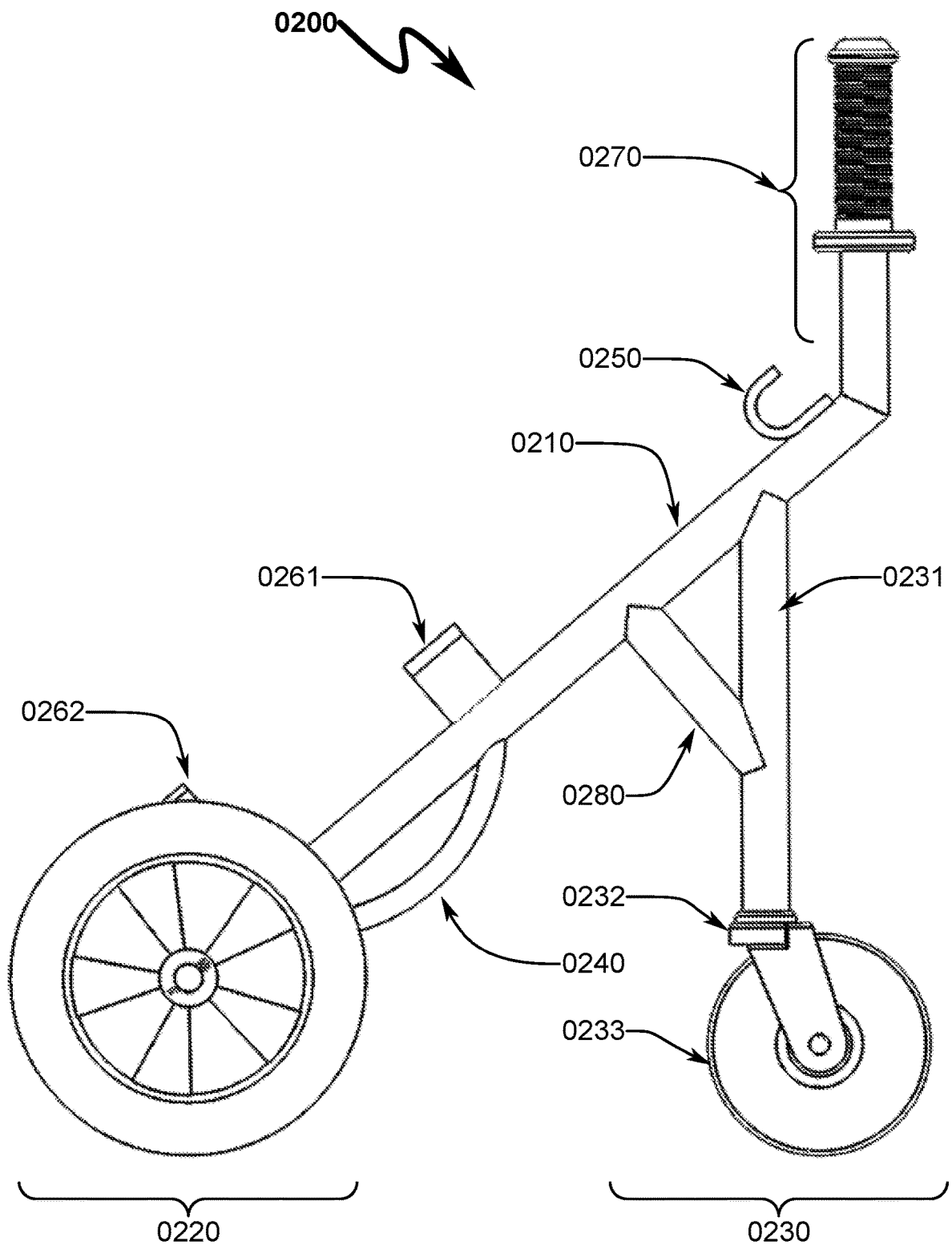
FIG. 2 illustrates a right side view of a preferred exemplary invention embodiment.

As generally depicted in FIG. 1 (0100)-FIG. 2 (0200), support for the radial wheel assembly (0130, 0230) is provided for by a radial support member (0131, 0231) attached to the dolly frame spine (DFS) (0110, 0210). An additional optional radial wheel stabilizer (RWS) (0180, 0280) may also be present. The radial wheel assembly (0130, 0230) includes a rotating caster support (0132, 0232) that supports a wheel (0133, 0233) that is free to rotate within the rotating caster support (0132, 0232) as the rotating caster support (0132, 0232) is free to rotate about the longitudinal axis of the radial support member (0131, 0231) via use of bearings within the rotating caster support (0132, 0232) at the interface between the rotating caster support (0132, 0232) and the radial support member (0131, 0231).

Figure 3:
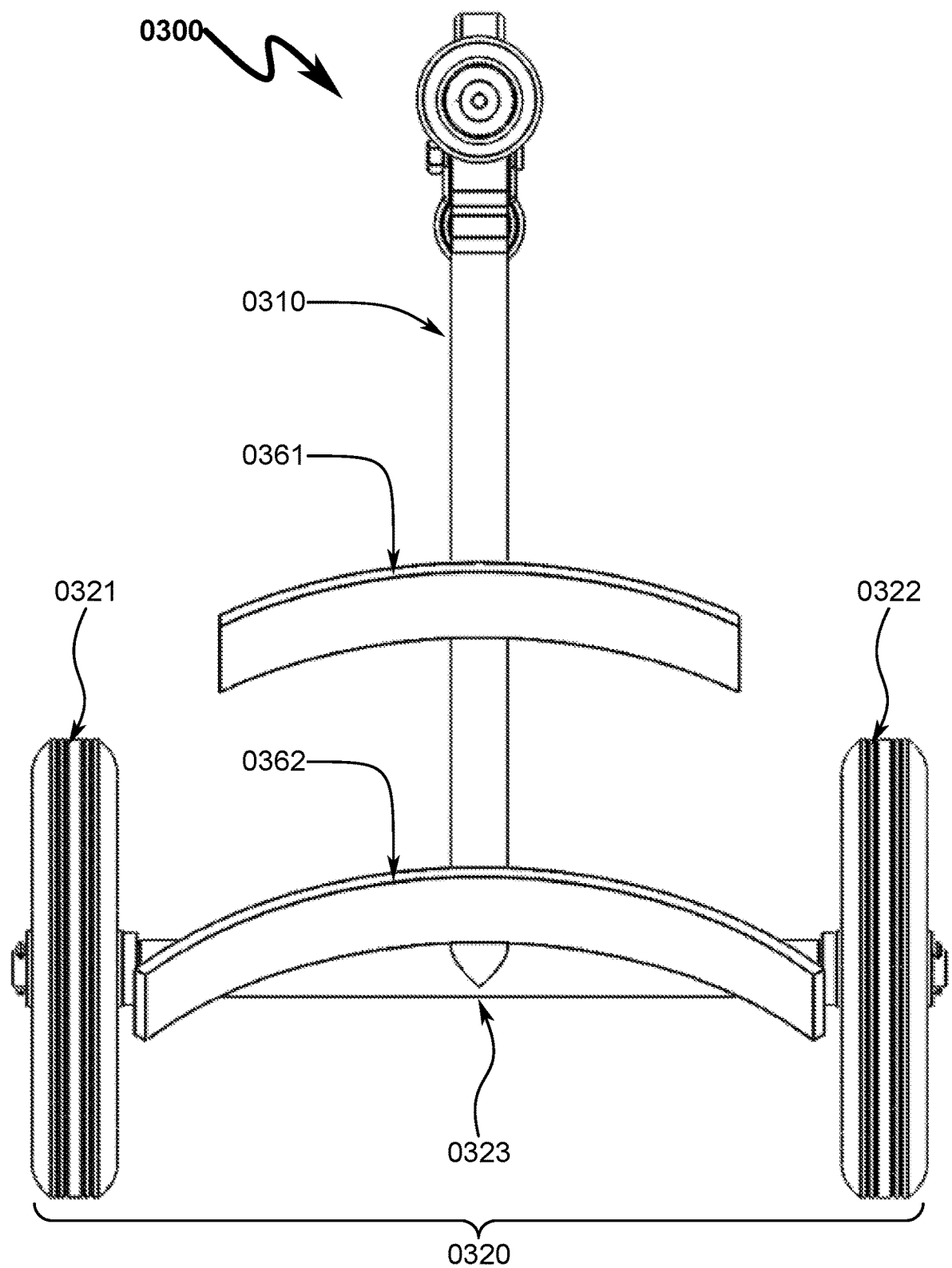
FIG. 3 illustrates a top view of a preferred exemplary invention embodiment.
Figure 4:
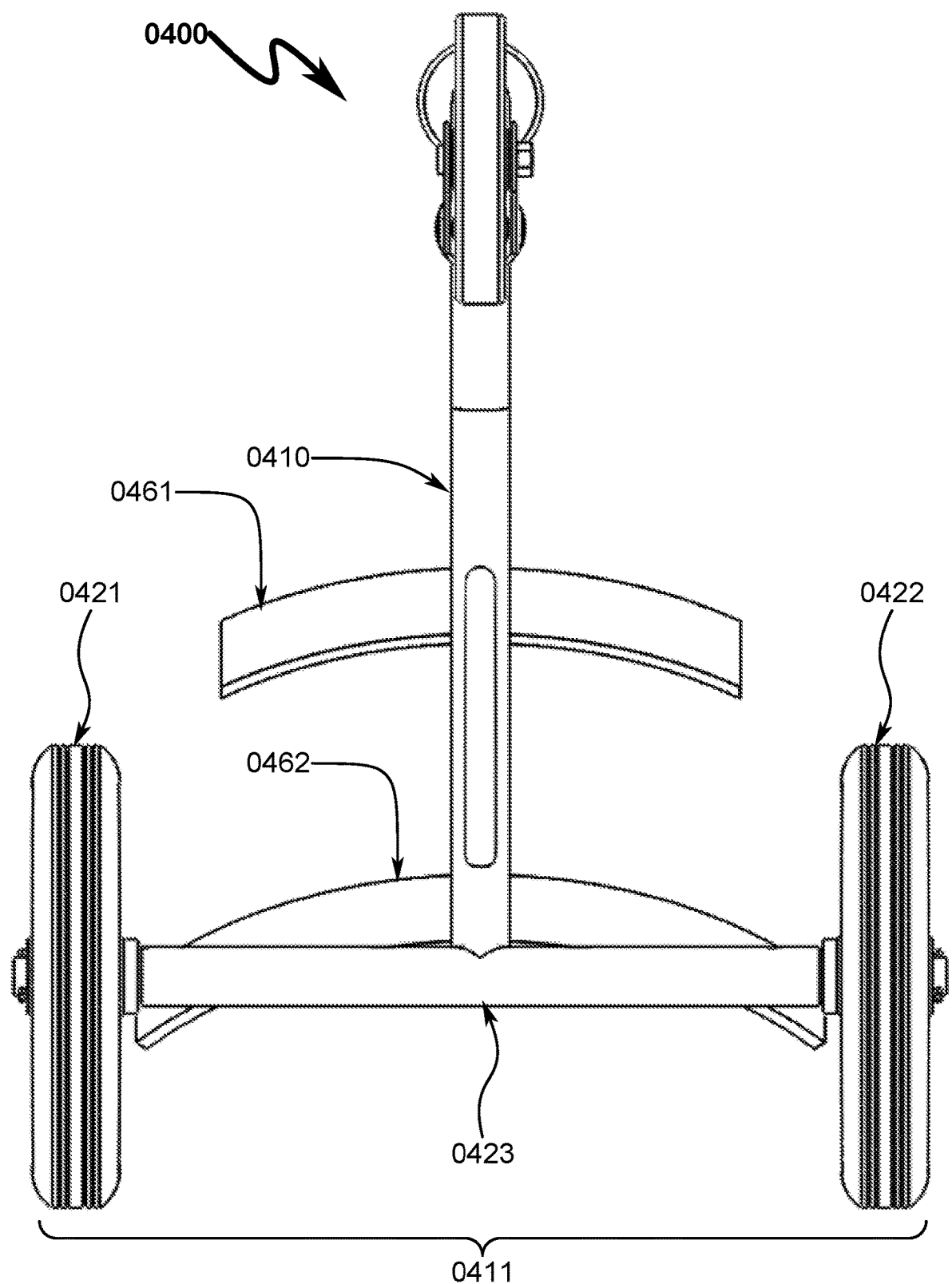
FIG. 4 illustrates a bottom view of a preferred exemplary invention embodiment.
Figure 5:
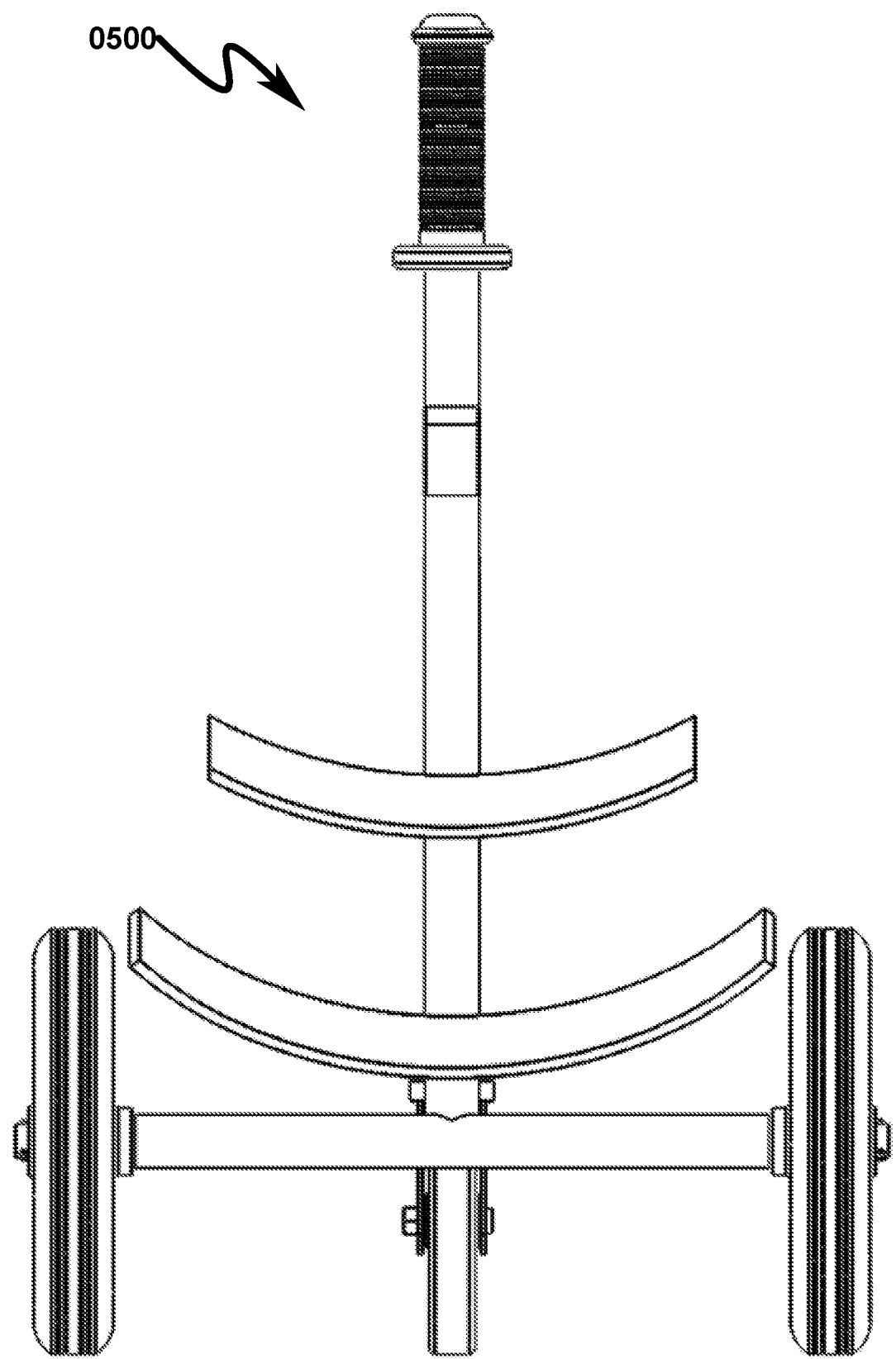
FIG. 5 illustrates a front view of a preferred exemplary invention embodiment.
Figure 6:
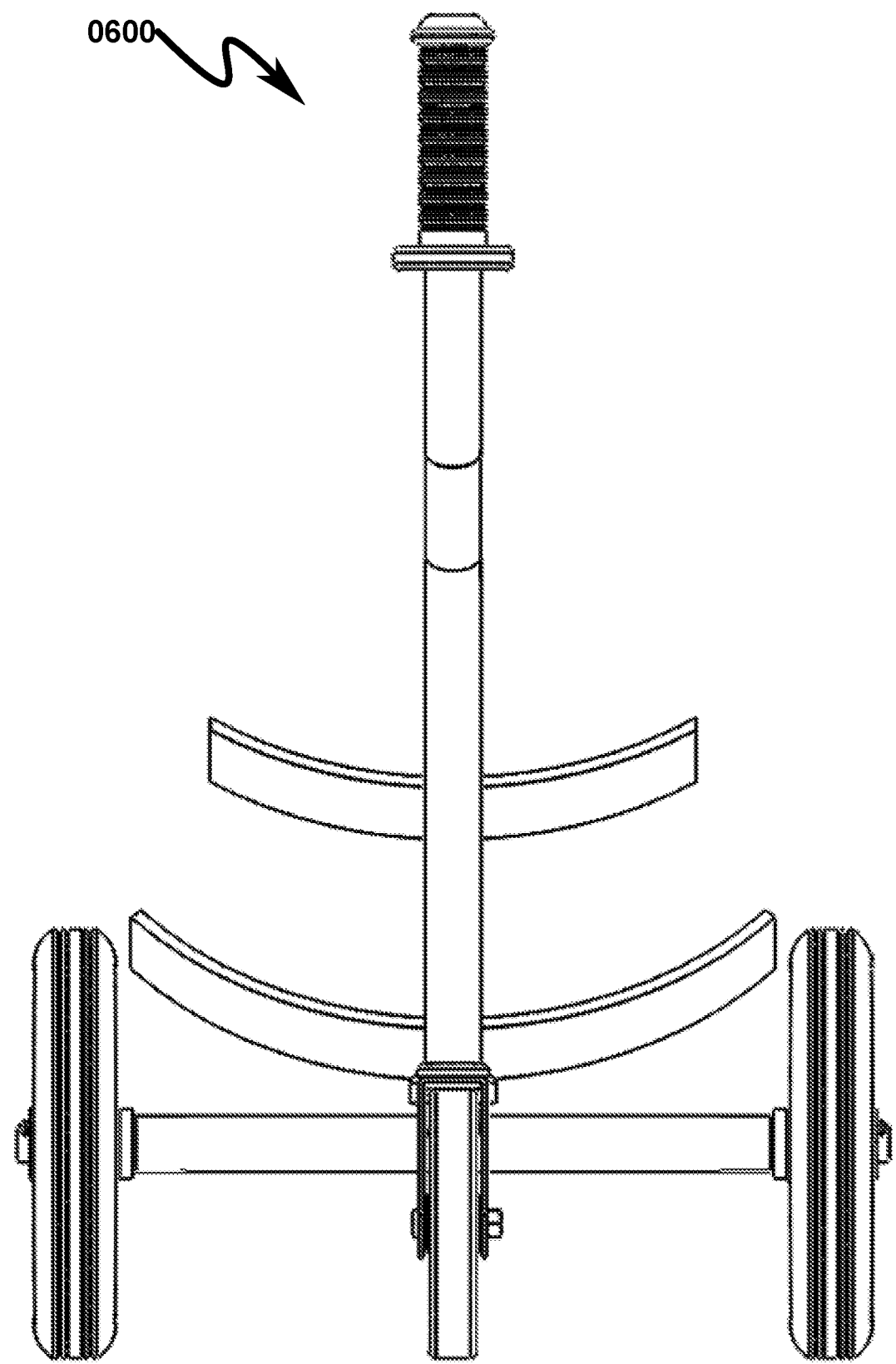
FIG. 6 illustrates a rear view of a preferred exemplary invention embodiment.
Figure 7:
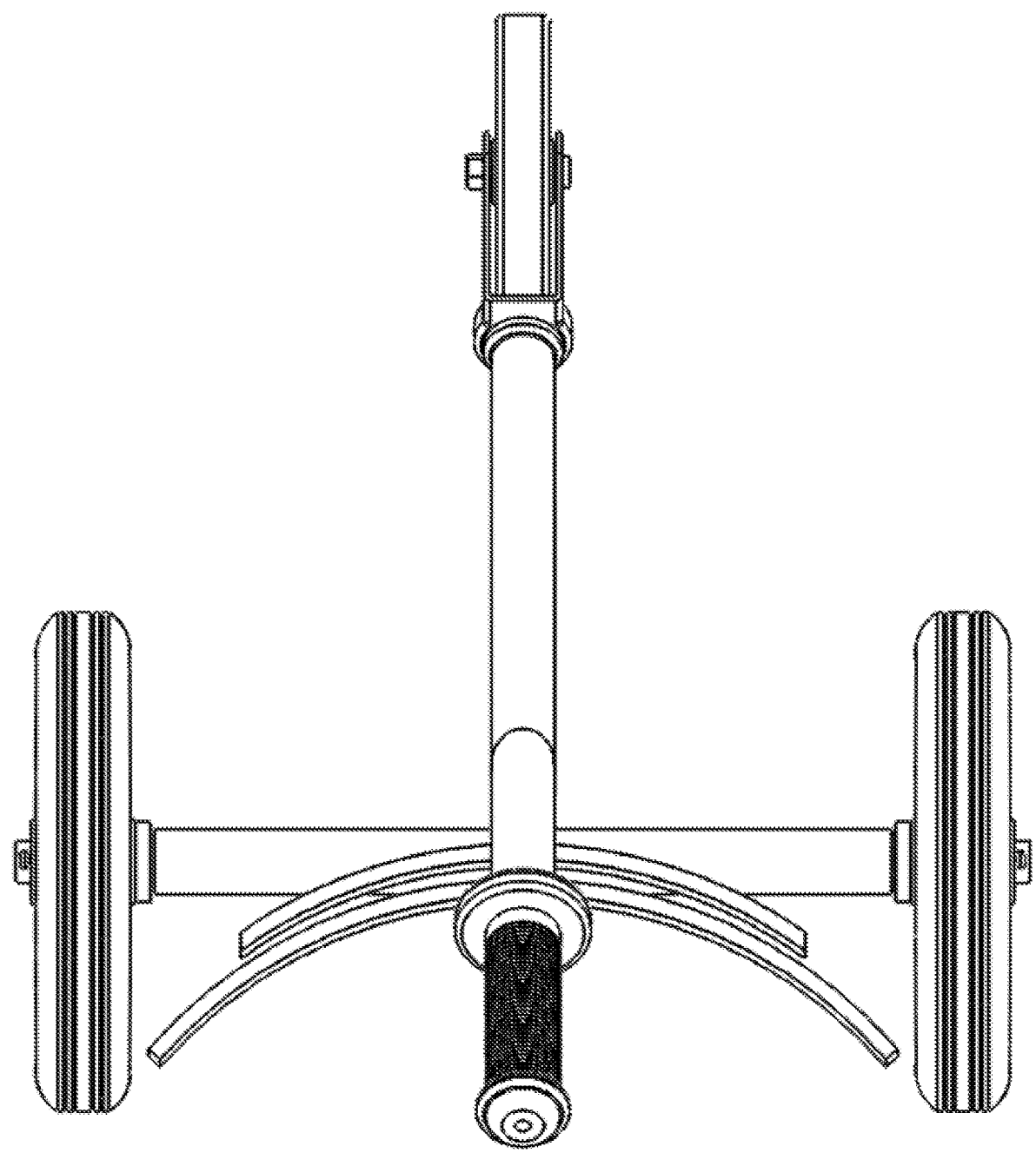
FIG. 7 illustrates a top keg perspective view of a preferred exemplary invention embodiment.
Figure 8:
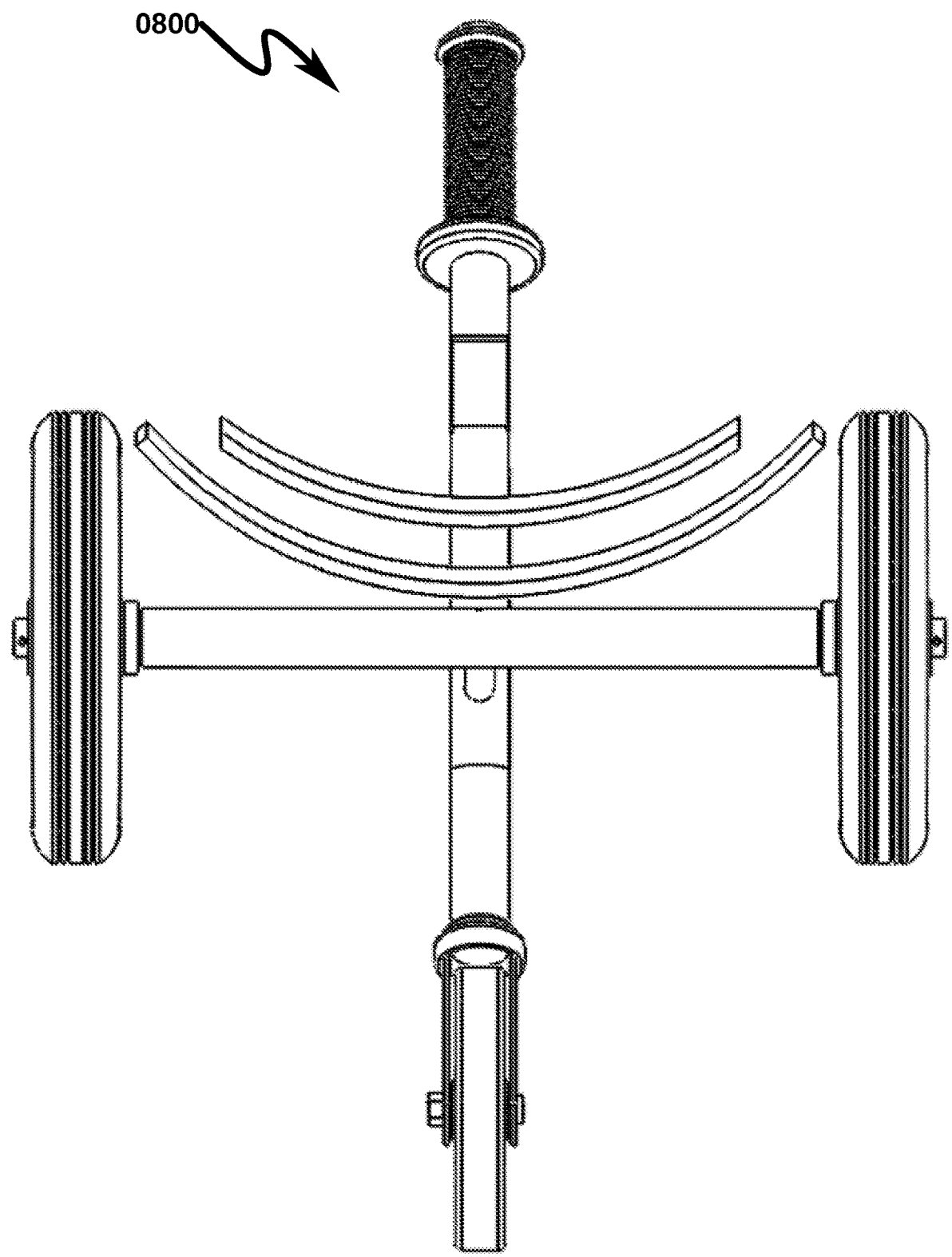
FIG. 8 illustrates a bottom keg perspective view of a preferred exemplary invention embodiment.
Figure 9:
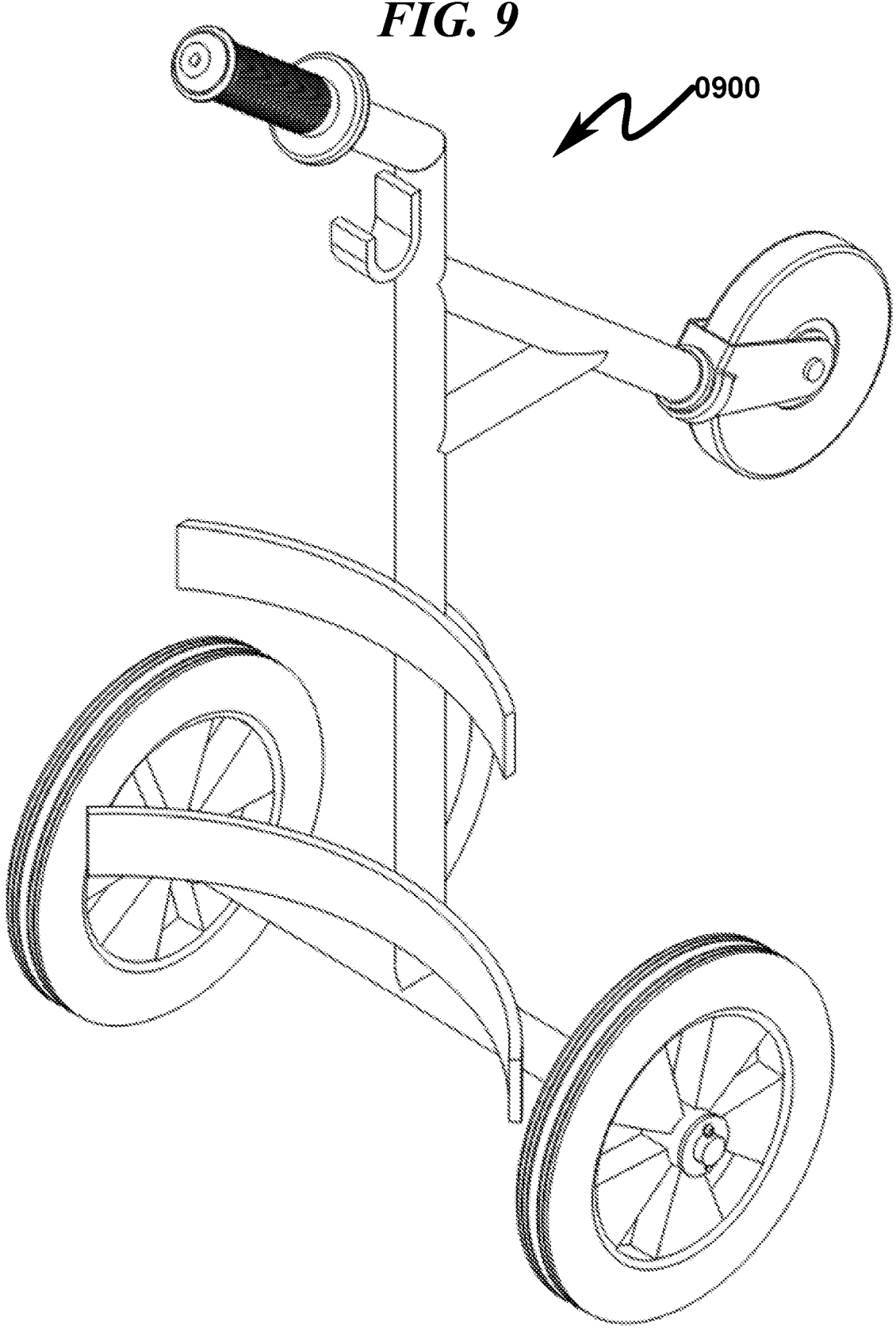
FIG. 9 illustrates a right front top perspective view of a preferred exemplary invention embodiment.
Figure 10:
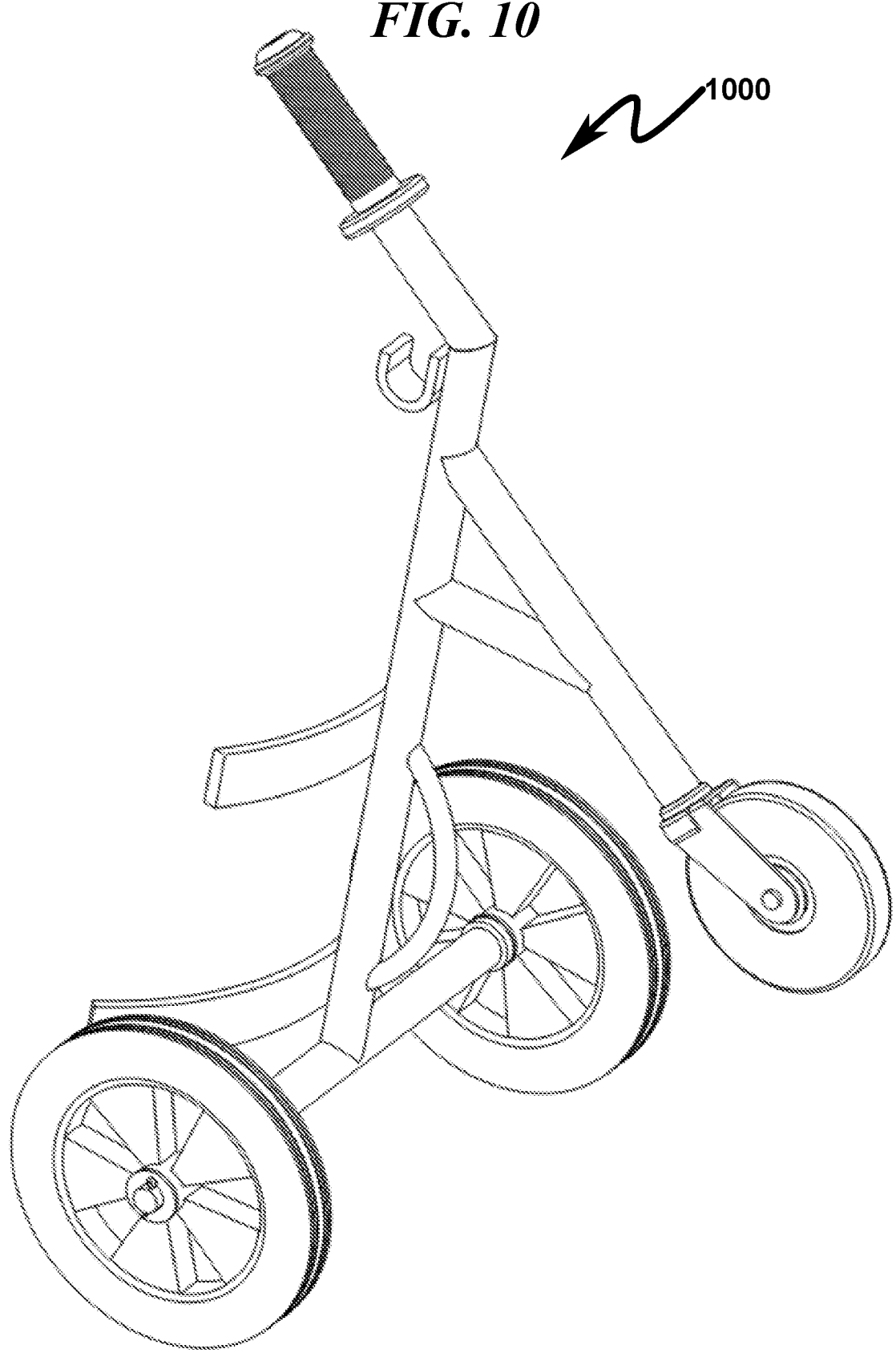
FIG. 10 illustrates a right rear top perspective view of a preferred exemplary invention embodiment.
Figure 11:
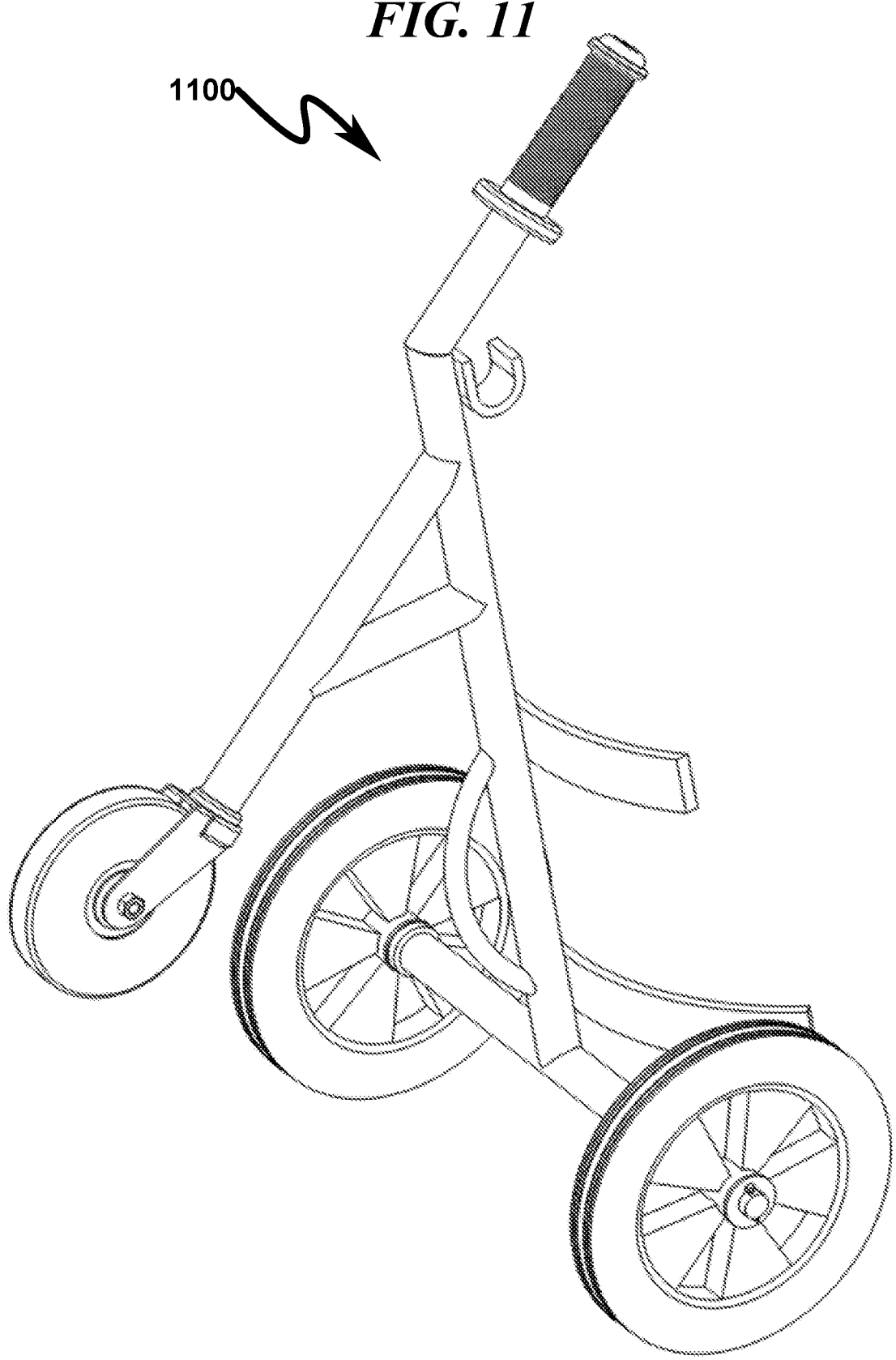
FIG. 11 illustrates a left rear top perspective view of a preferred exemplary invention embodiment.
Figure 12:
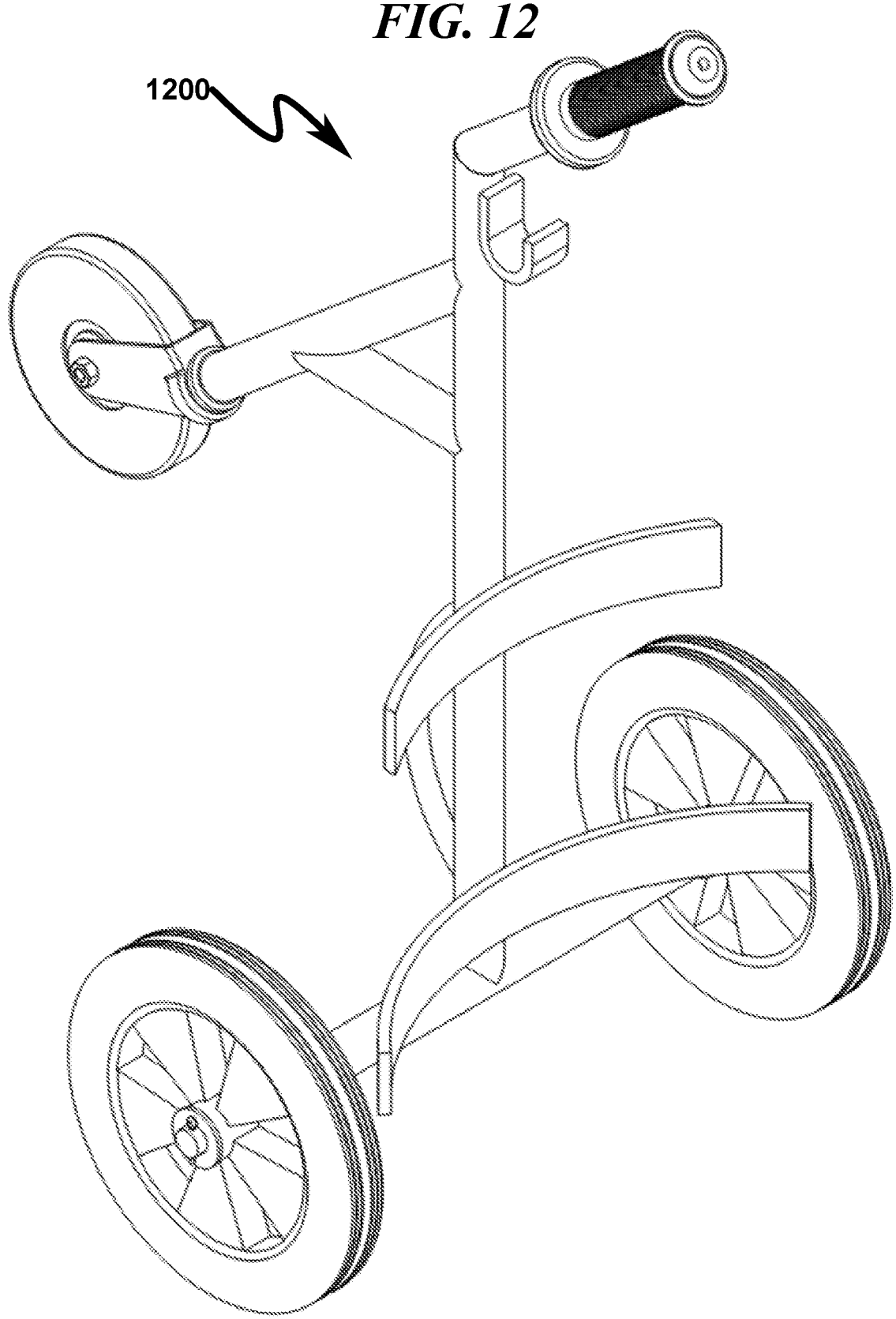
FIG. 12 illustrates a left front top perspective view of a preferred exemplary invention embodiment.
Figure 13:
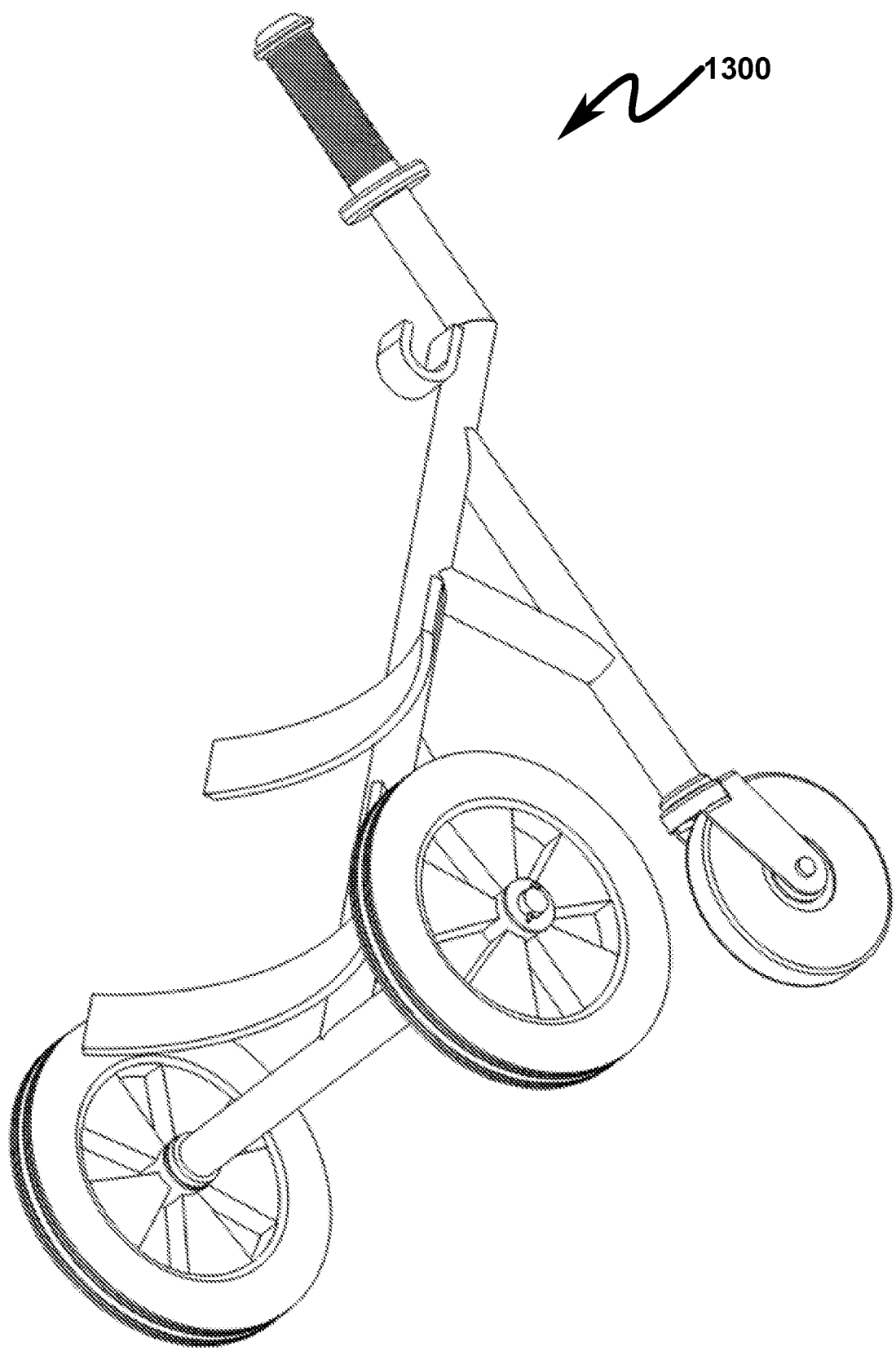
FIG. 13 illustrates a right front bottom perspective view of a preferred exemplary invention embodiment.
Figure 14:
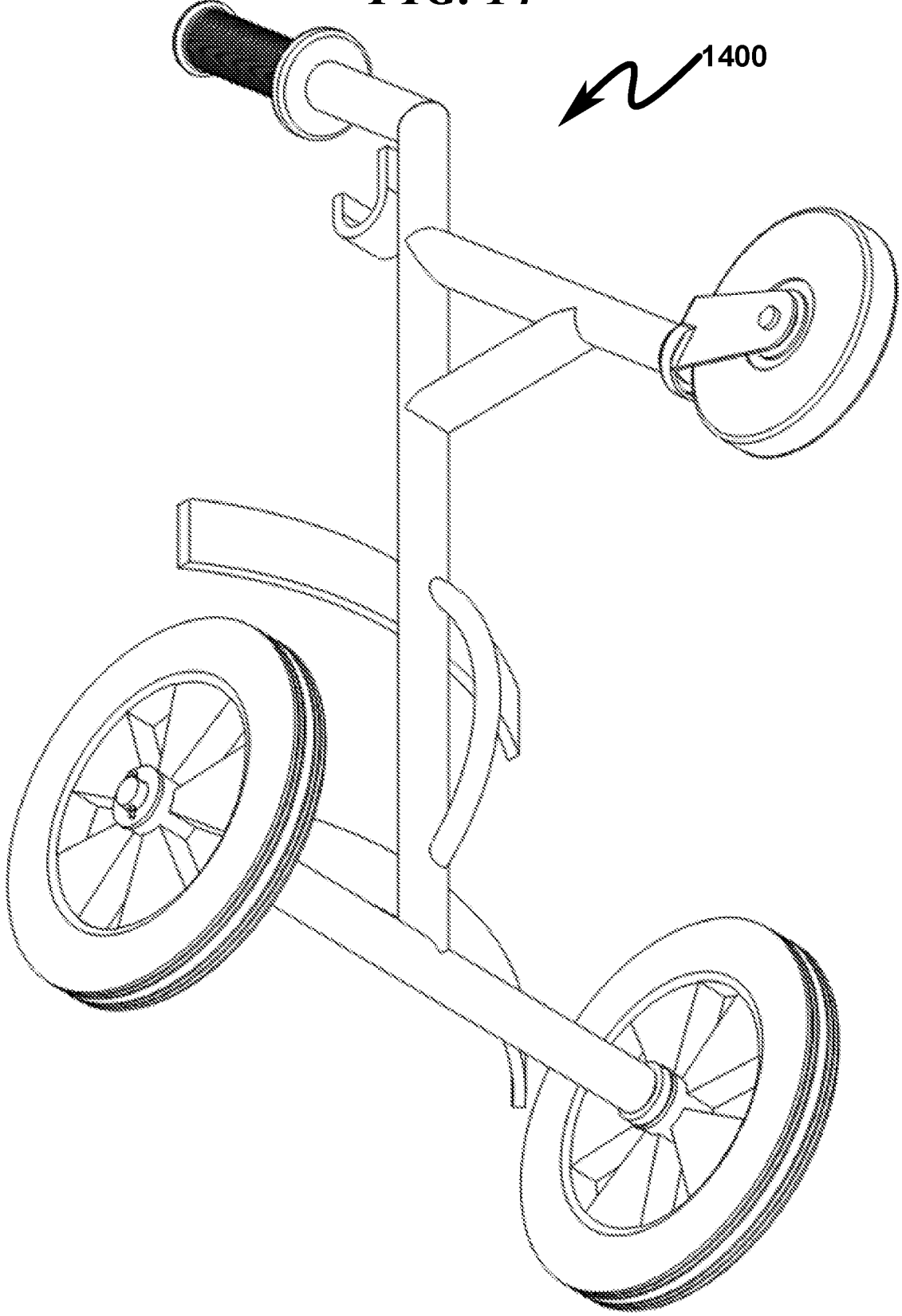
FIG. 14 illustrates a right rear bottom perspective view of a preferred exemplary invention embodiment.
Figure 15:
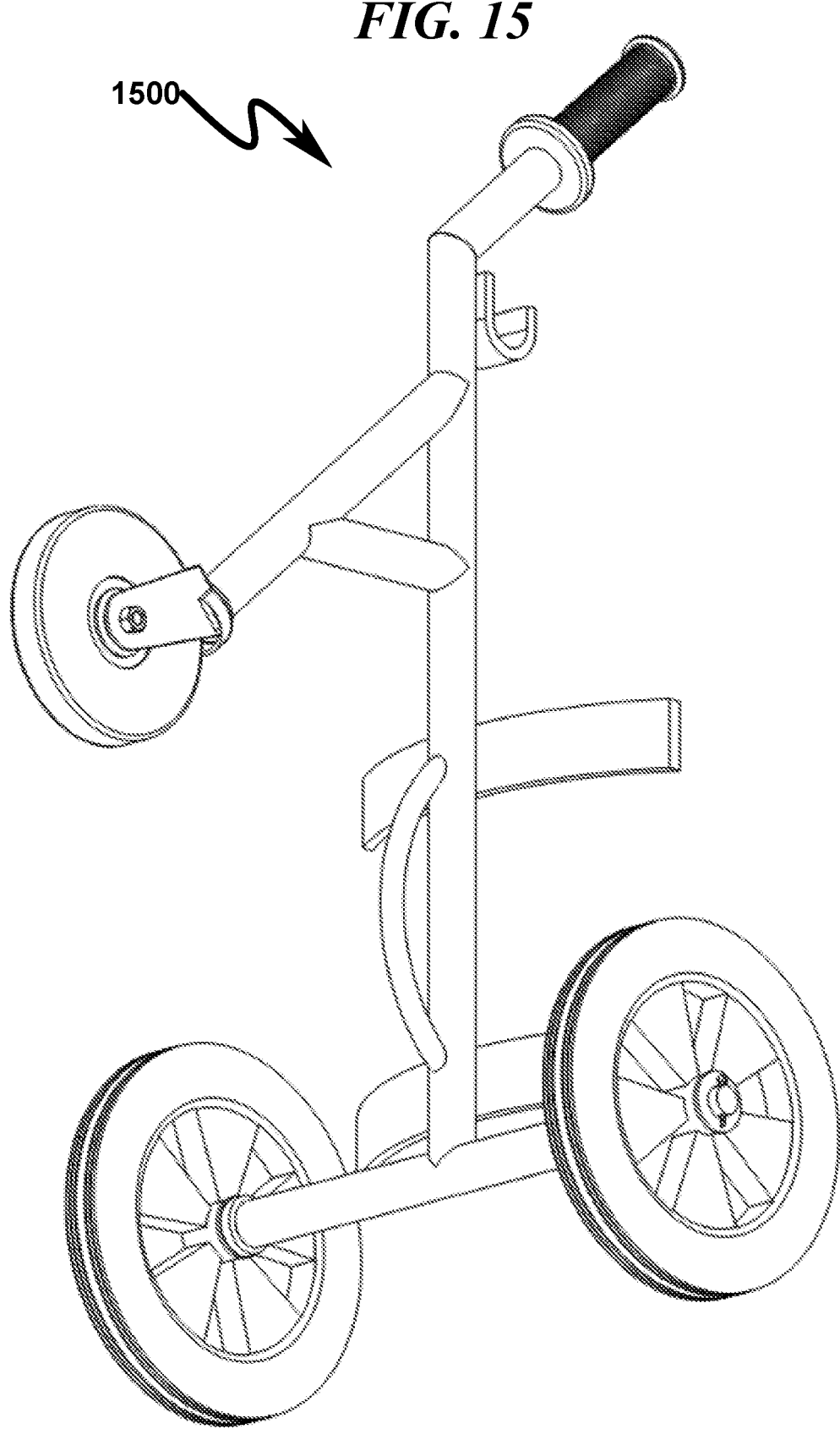
FIG. 15 illustrates a left rear bottom perspective view of a preferred exemplary invention embodiment.

As generally depicted in FIG. 3 (0300)-FIG. 4 (0400), the dolly frame spine (DFS) (0310, 0410) and axial wheel assembly (AWA) (0320, 0420) are attached so as to provide support for a left wheel (0321, 0421) and right wheel (0322, 0422) along an axle member (0323, 0423) of the axial wheel assembly (AWA) (0320, 0420). The axle member (0323, 0423) may incorporate bushings and/or bearings at each distal end to support an internal axle that mates with the left wheel (0321, 0421) and right wheel (0322, 0422) respectively. Alternatively, the left wheel (0321, 0421) and right wheel (0322, 0422) may incorporate internal bushings/bearings that mate with the axle member (0323, 0423) of the axial wheel assembly (AWA) (0320, 0420).

Beverage keg (BK) transportation uses the KAH (0140, 0240) to lift the BKD and engage/cradle the KEH (0150, 0250) to a BK within the BKC. Once cradled by the beverage keg cradle (BKC) (0161, 0162, 0261, 0262), the BK is lifted off the ground and supported by the AWA (0120, 0220) via depression of the VRH (0170, 0270). The BK axially rotates about the AWA (0120, 0220) by the VRH (0170, 0270) until the BK center of gravity transitions a vertical equipoise plane (VEP) extending from the AWA (0120, 0220) longitudinal axis. The weight of the BK is then supported by the AWA (0120, 0220) and the RWA (0130, 0230). Transportation and/or circular rotation of the BK may then be affected by rotation/movement of the VRH (0170, 0270) as the BK is sufficiently mated to the BKD and stabilized by the beverage keg cradle (BKC) (0161, 0162, 0261, 0262).

FIG. 1 (0100)-FIG. 16 (1600) show various views of the BKD. It should be noted that the angle at which the dolly frame spine (DFS) (0110, 0210) and the radial wheel assembly (RWA) (0130, 0230) engage is typically in the range of 45 degrees to 50 degrees to enable the vertical equipoise plane (VEP) of the AWA (0120, 0220) longitudinal axis to ensure downward stability of the BKD/BK combination and ensure that the radial wheel assembly (RWA) (0130, 0230) maintains solid contact with the ground once the BKD is articulated to load the BK. The angle at which the dolly frame spine (DFS) (0110, 0210) and vertical rotation handle (VRH) (0170, 0270) engage is typically in the same angular range and typically the same as the RWA, but need not be so. The angle between the vertical rotation handle (VRH) (0170, 0270) and dolly frame spine (DFS) (0110, 0210) is typically chosen to ensure that once loaded with the BK, the vertical rotation handle (VRH) (0170, 0270) is oriented in a vertical position to enable rotation of the BKD/BK combination.

While the present invention embodiments illustrated in the drawings incorporate multiple beverage keg cradle (BKC) (0161, 0162, 0261, 0262) arc-shaped members to support the BK, the present invention can be implemented with only one arc-shaped member. The use of the arc-shaped members provides for rotational stability of the BKD/BK combination once the BK has been hooked and secured by the keg engagement hook (KEH) (0150, 0250). The optional radial wheel stabilizer (RWS) (0180, 0280) may be implemented in some situations to stabilize the connection between the dolly frame spine (DFS) (0110, 0210) and RWA (0130, 0230). Some preferred invention embodiments will not implement the optional radial wheel stabilizer (RWS) (0180, 0280) and the figures provided include this optional component with the knowledge that one skilled in the art will have no difficulty in realizing the invention without this optional component. The keg alignment handle (KAH) (0140, 0240) may take many forms, but generally has two distal ends that are connected to the dolly frame spine (DFS) (0110, 0210) such that it permits lifting and angular articulation of the BKD to allow engagement of the KEH (0150, 0250) to the BK.

While dimensions for the BKD may be tailored to an a number of standardized BK sizes, for the purposes of many preferred invention embodiments, the AWA (0120, 0220) and the RWA (0130, 0230) may consist of 6-inch diameter and 5-inch diameter wheels respectively. This sizing provides for a compact design in which the AWA need not extend beyond the diameter of the BK and the RWA provides for ease of rotation and mobility consistent with stable BK containment.

Method Overview (1700)-(2400)

Figure 17:
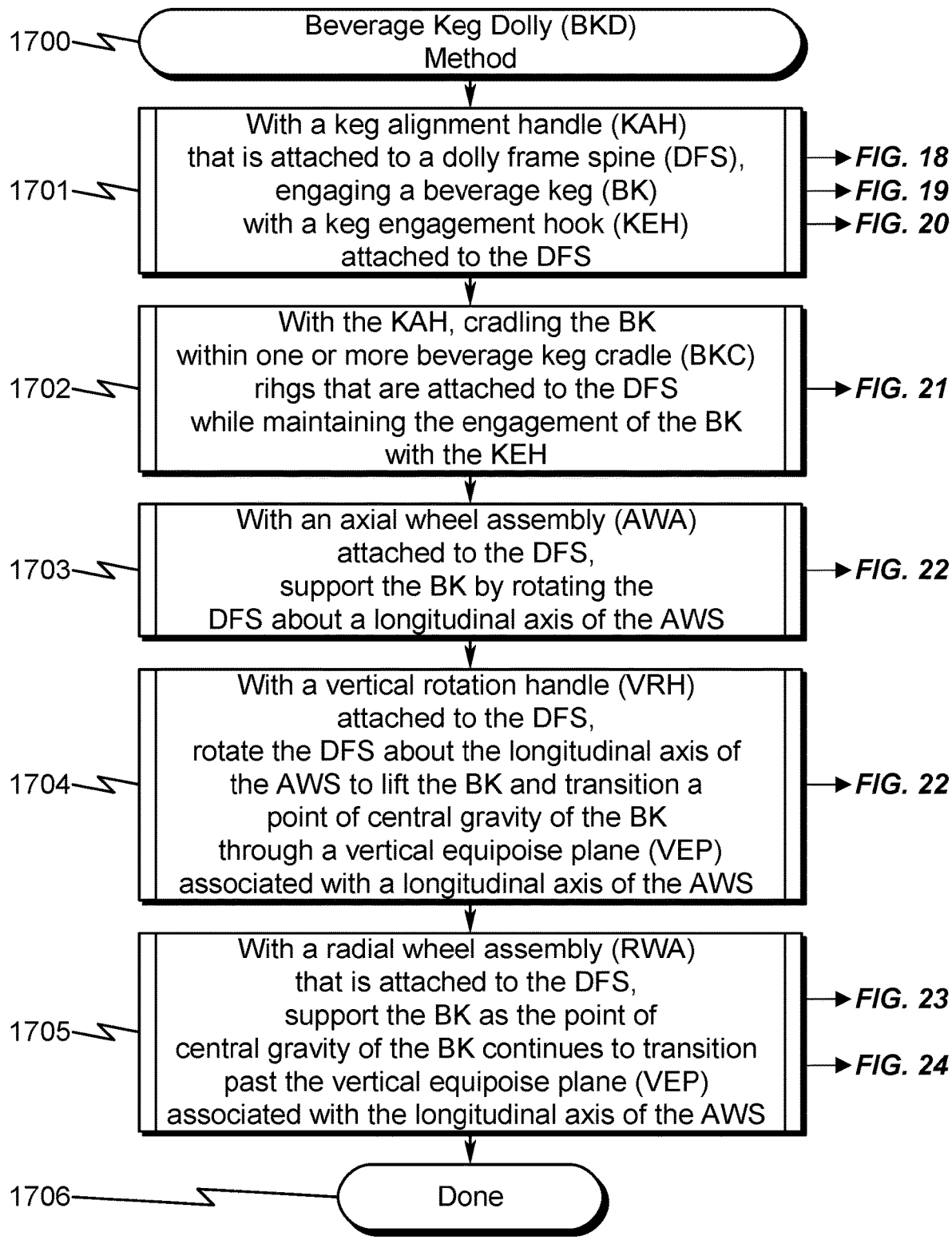
FIG. 17 illustrates flowchart depicting a preferred exemplary method embodiment of the present invention.
Figure 24:
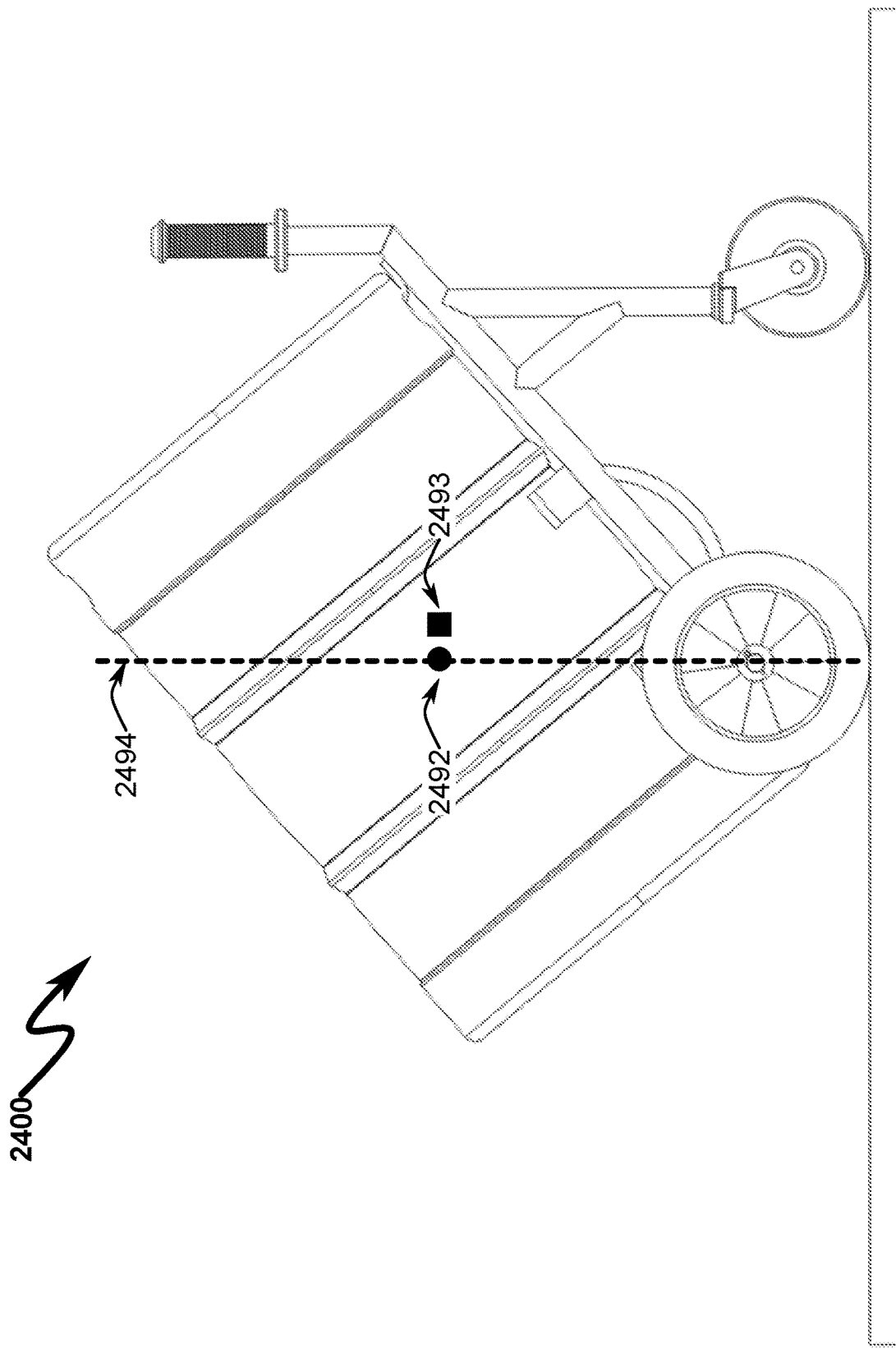
FIG. 24 illustrates an exemplary method step depicting use of the present invention depicting the relationship between the point of central gravity and vertical equipoise plane (VEP) an exemplary method step depicting use of the present invention.

This present invention setup method anticipates a wide variety of variations in the basic theme of implementation, but can be generalized as depicted in FIG. 17 (1700)-FIG. 24 (2400) as a beverage keg dolly method consisting of:

(1) With a keg alignment handle (KAH) that is attached to a dolly frame spine (DFS), engaging a beverage keg (BK) with a keg engagement hook (KEH) attached to the DFS (1701);

(2) With the KAH, cradling the BK within one or more beverage keg cradle (BKC) arcs that are attached to the DFS while maintaining the engagement of the BK with the KEH (1702);

(3) With an axial wheel assembly (AWA) attached to the DFS, supporting the BK by rotating the DFS about the longitudinal axis of the AWS (1703);

(4) With a vertical rotation handle (VRH) attached to the DFS, rotating the DFS about the longitudinal axis of the AWS to lift the BK and transition a point of central gravity of the BK through a vertical equipoise plane (VEP) associated with a longitudinal axis of the AWS (1704);

(5) With a radial wheel assembly (RWA) that is attached to the DFS, supporting the BK as the point of central gravity of the BK continues to transition past the VEP (1705).

This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

The method as described above may be reversed in situations where the vertical rotation handle (VRH) has been used to position the BK/BKD combination at a point where the BK is to be terminally located. The VRH may be used in these situations to rotate the BK/BKD combination in tight quarters to align the BK for terminal placement.

Figure 18:
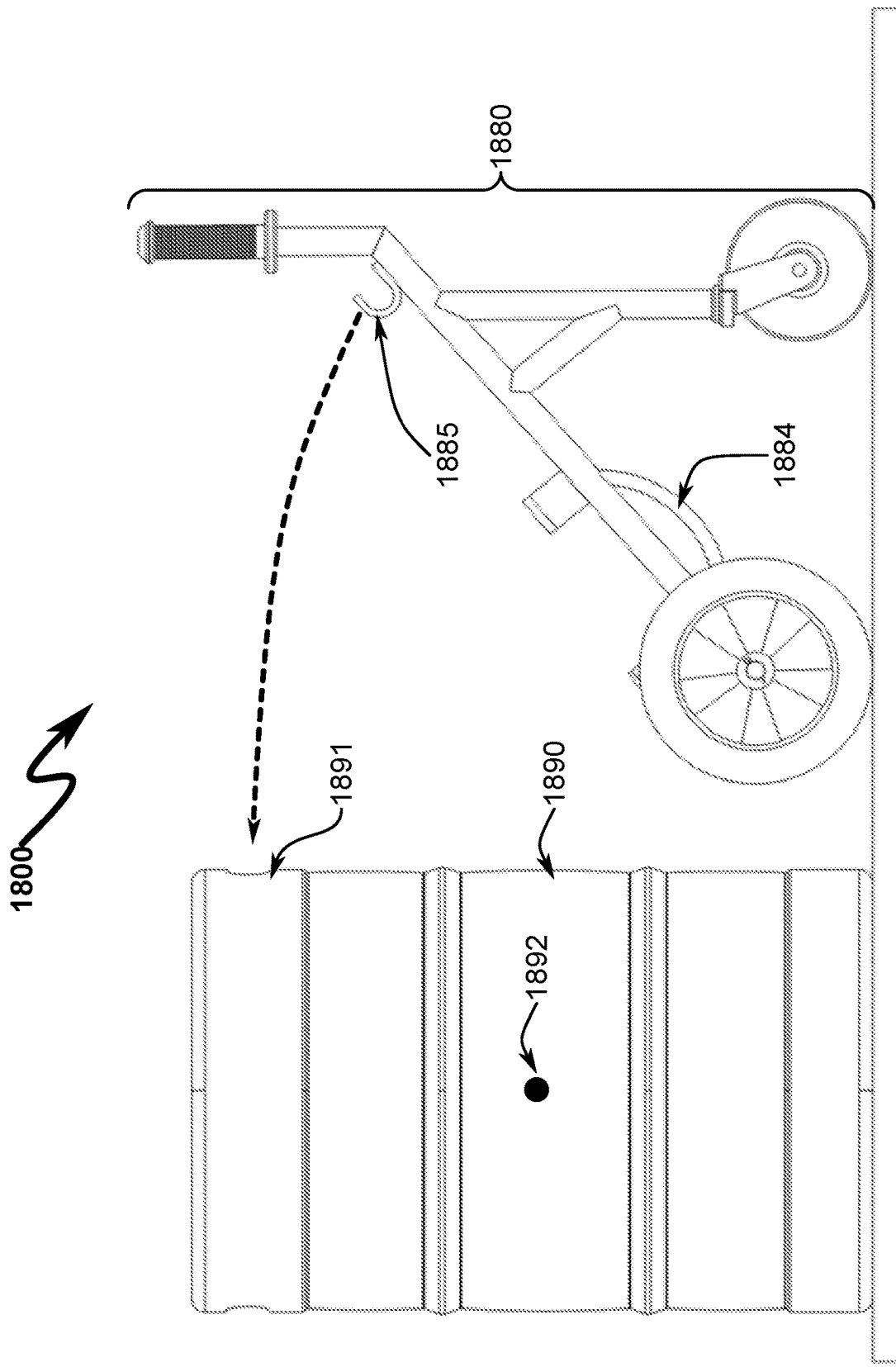
FIG. 18 illustrates an exemplary method step depicting use of the present invention depicting initial pre-coupling states of the BKD and the BK.
Figure 19:
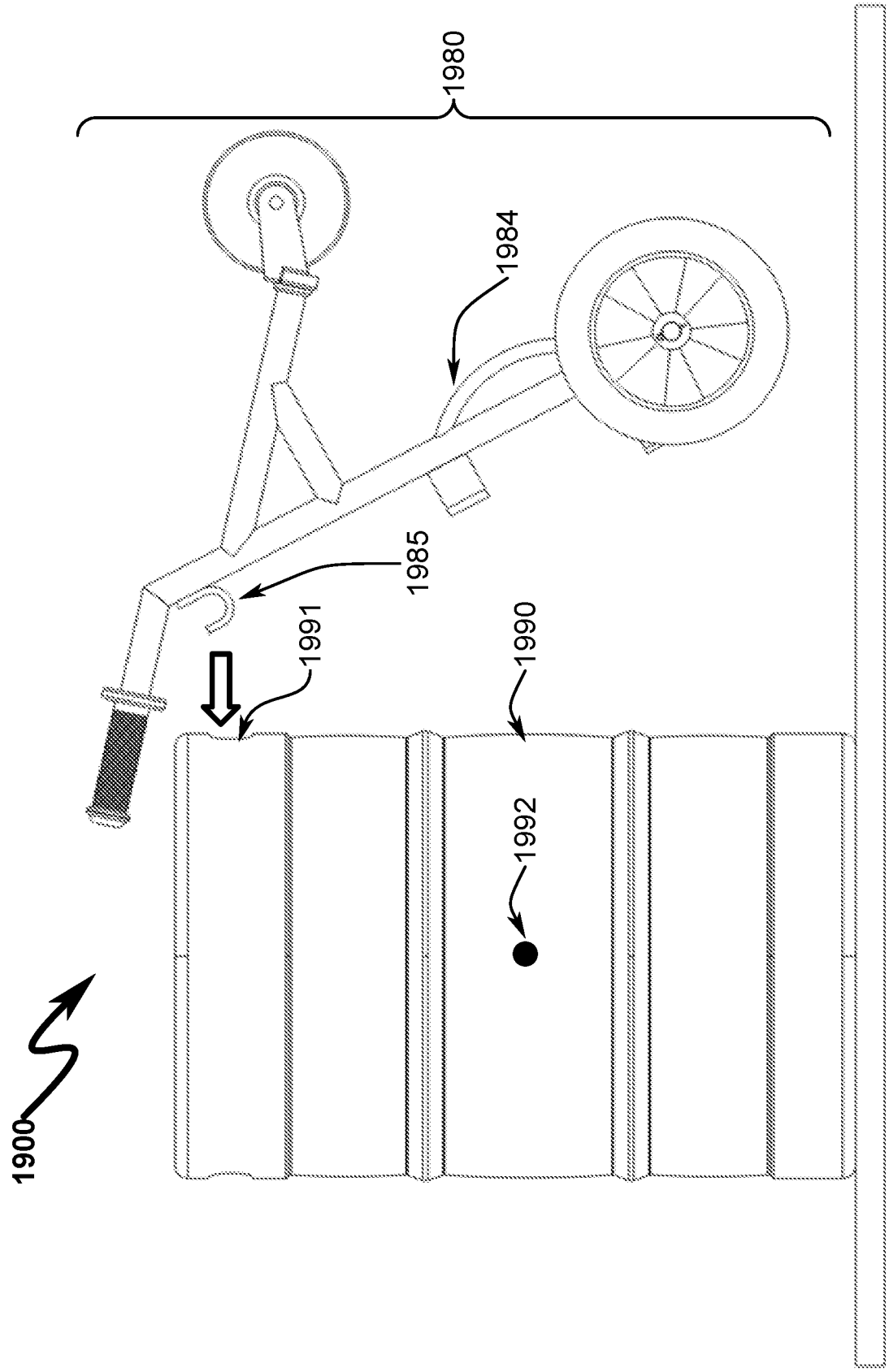
FIG. 19 illustrates an exemplary method step depicting use of the present invention depicting preliminary movement of the BKD/KEH to the BK.
Figure 20:
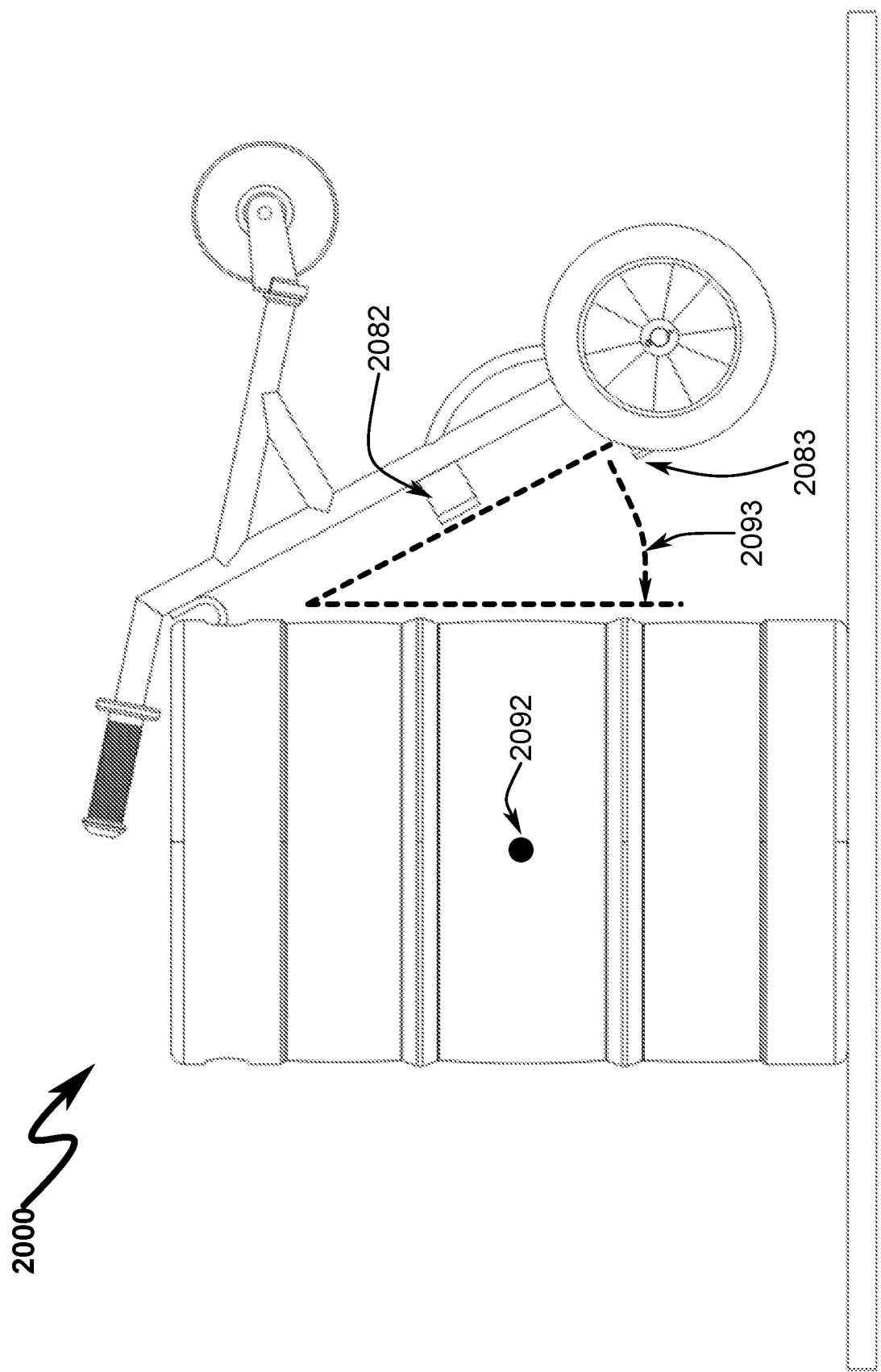
FIG. 20 illustrates an exemplary method step depicting use of the present invention depicting initial engagement of the KEH with the BK.

This method and mode of operation is generally depicted in FIG. 18 (1800)-FIG. 24 (2400). Here it can be seen that in FIG. 18 (1800) the beverage keg dolly (BKD) (1880) and beverage keg (BK) (1890) are in their initial resting positions with the beverage keg (BK) (1890) depicted with a keg engagement void (KEV) (1891) for lifting purposes and point of central gravity (1892) as seen from a side view of the beverage keg (BK) (1890). The beverage keg hook (BKH) (1885) on the beverage keg dolly (BKD) (1880) is rotated/positioned using the keg alignment handle (KAH) (1884) to engage a keg engagement void (KEV) (1891) in the beverage keg (BK) (1890). This rotational transition of the beverage keg dolly (BKD) (1880) is generally depicted in FIG. 18 (1800)-FIG. 20 (2000). Note that in this alignment there is no need to lift or position the beverage keg (BK) (1890), just the beverage keg dolly (BKD) (1880). As seen in FIG. 19 (1900), the beverage keg dolly (BKD) (1980) may be lifted via the keg alignment handle (KAH) (1984) to position the beverage keg hook (BKH) (1984) to engage a keg engagement void (KEV) (1991) in the beverage keg (BK) (1990). As generally depicted in FIG. 20 (2000), once the beverage keg hook (BKH) is engaged, the beverage keg dolly (BKD) is rotated (2093) to engage one or more beverage keg cradle (BKC) arcs (2082, 2083) on the beverage keg dolly (BKD) with the outer cylindrical surface of the beverage keg (BK). During this process the point of central gravity (2092) remains stationary on the beverage keg (BK).

Figure 21:
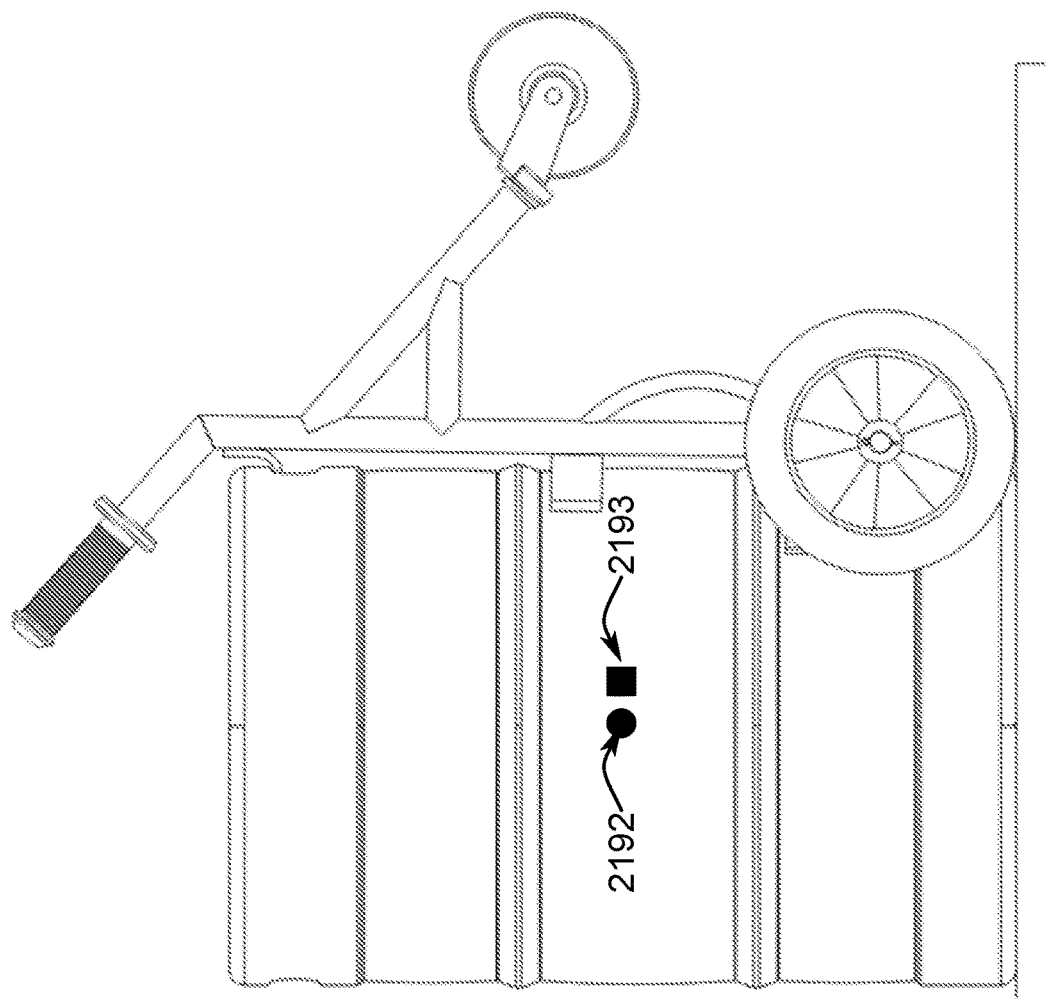
FIG. 21 illustrates an exemplary method step depicting use of the present invention depicting full engagement of the KEH with the BK.

However, as generally depicted in FIG. 21 (2100), once the beverage keg dolly (BKD) and beverage keg (BK) are mated via the process depicted in FIG. 18 (1800)-FIG. 20 (2000), the resulting point of central gravity shifts from that of the beverage keg (BK) (2192) to that of the combination (2193) of the beverage keg dolly (BKD) and beverage keg (BK). This slight shift in central gravity is due to the weight offset associated with the addition of the beverage keg dolly (BKD) to the beverage keg (BK).

Figure 22:
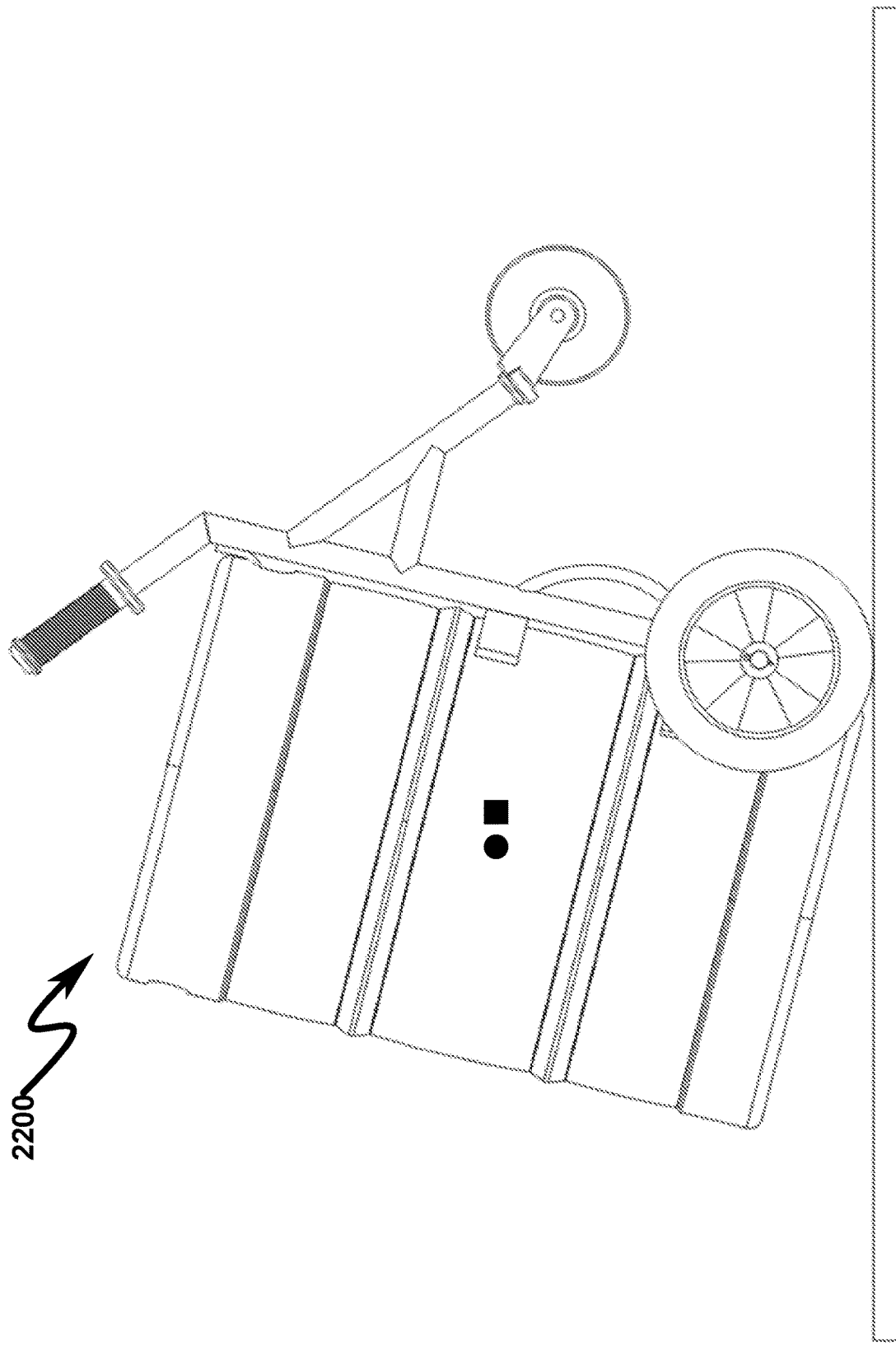
FIG. 22 illustrates an exemplary method step depicting use of the present invention depicting lifting of the BK by the BKD.
Figure 23:
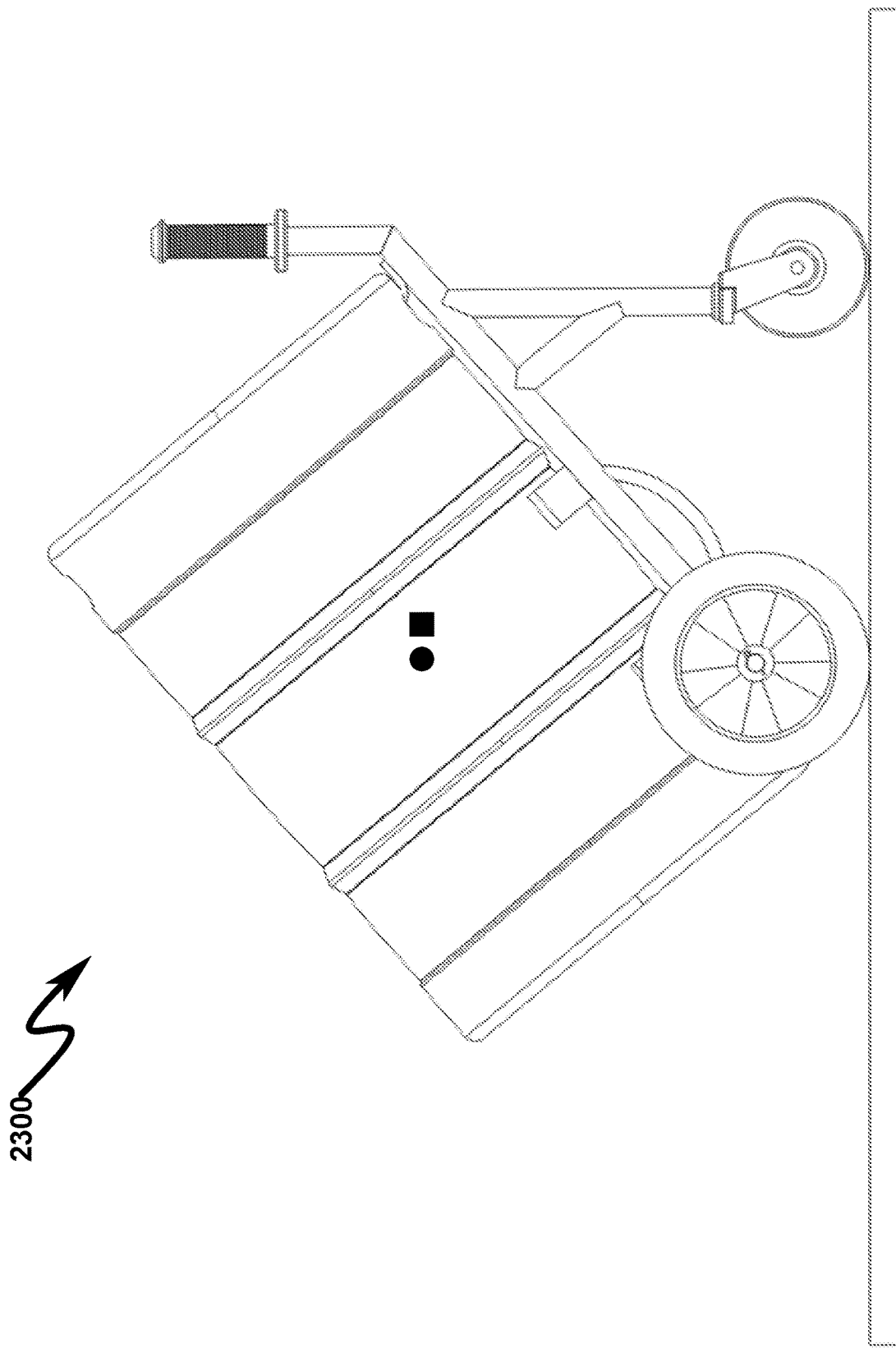
FIG. 23 illustrates an exemplary method step depicting use of the present invention depicting a state of three-point stability.

Referencing FIG. 22 (2200), as the beverage keg dolly (BKD) is rotated about a longitudinal axis associated with the axial wheel assembly (AWS), the two wheels of the axial wheel assembly (AWS) support the load of the beverage keg (BK) along with downward pressure on the vertical rotation handle (VRH). FIG. 23 (2300) depicts the condition in which this rotation continues until the radial wheel assembly (RWA) touches the ground plane associated with the wheel plane of the axial wheel assembly (ANA).

Referencing FIG. 24 (2400), it can be seen that the beverage keg dolly (BKD) is constructed such that as the beverage keg dolly (BKD) is rotated to lift the beverage keg (BK), the combined point of central gravity (2493) passes a vertical plane associated with the axial wheel assembly (AWA) (herein referred to as the vertical equipoise plane (VEP)). This ensures that weight will be transferred from the wheels associated with the axial wheel assembly to the wheel/swivel associated with the radial wheel assembly (RWA). At this point the beverage keg dolly (BKD) is stable on three points of contact with the horizontal ground plane and can be manipulated about the wheels of the AWA and RWA by simply rotating the vertical rotation handle (VRH). It is significant to note that the combination of the keg engagement hook (KEH) and beverage keg cradle (BKC) in conjunction with the positioning of the keg engagement hook (KEH) and configuration of the RWA ensure that the combination of the beverage keg dolly (BKD) and beverage keg (BK) is stable once all three wheels of the beverage keg dolly (BKD) are in contact with the horizontal ground plane.

Manipulation and Placement of the Beverage Keg (2500)-(2800)

Figure 25:
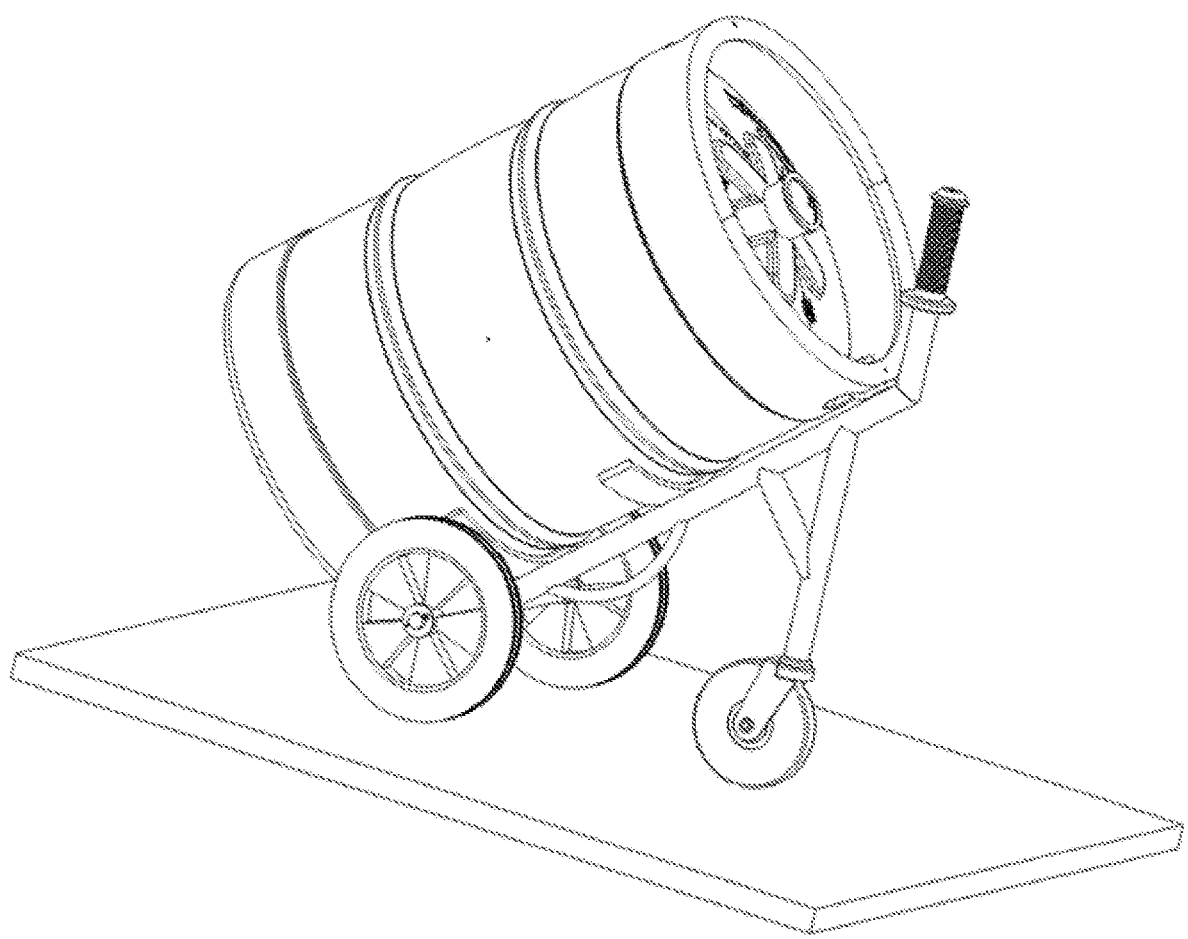
FIG. 25 illustrates a top perspective view of a BKD/BK combination prior to rotation of the BKD/BK combination depicting initial orientation of the RWA.
Figure 26:
FIG. 26 illustrates a top perspective view of a BKD combination prior to rotation of the BKD depicting initial orientation of the RWA.
Figure 27:
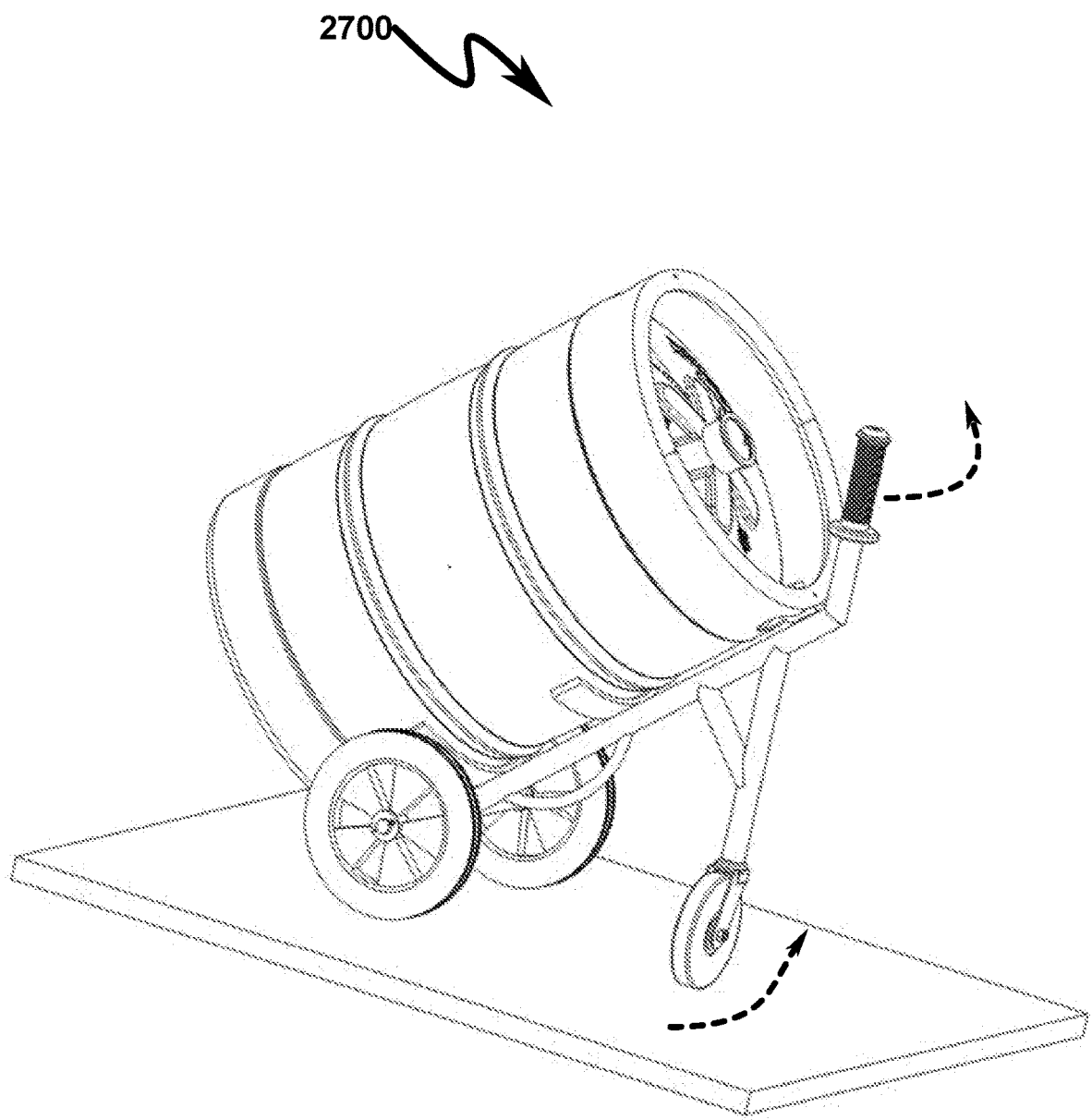
FIG. 27 illustrates a top perspective view of a BKD/BK combination after rotation of the BKD/BK combination depicting rotated orientation of the RWA.
Figure 28:
FIG. 28 illustrates a top perspective view of a BKD combination after rotation of the BKD depicting rotated orientation of the RWA.

As generally depicted in the drawings of FIG. 25 (2500)-FIG. 28 (2800), the vertical rotation handle (VRH) may be used to rotationally manipulate the BKD/BK combination once all three wheels (AWA and RWA) are placed on the horizontal ground plane. FIG. 25 (2500)-FIG. 26 (2600) illustrate the initial state of the BKD and BK and FIG. 27 (2700)-FIG. 28 (2800) illustrate rotation of the caster associated with the RWA after the VRH is rotated. The placement of the VRH permits orientation of the BKD/BK combination in tight quarters where there is no clearance between the back of the BKD and interfering furniture or equipment. This capability is especially useful in tight quarters environments such as behind bars and within restaurant food service areas.

Swivel Rotation Handle (SRH) Augmenting VRH (2900)-(3200)

Figure 29:
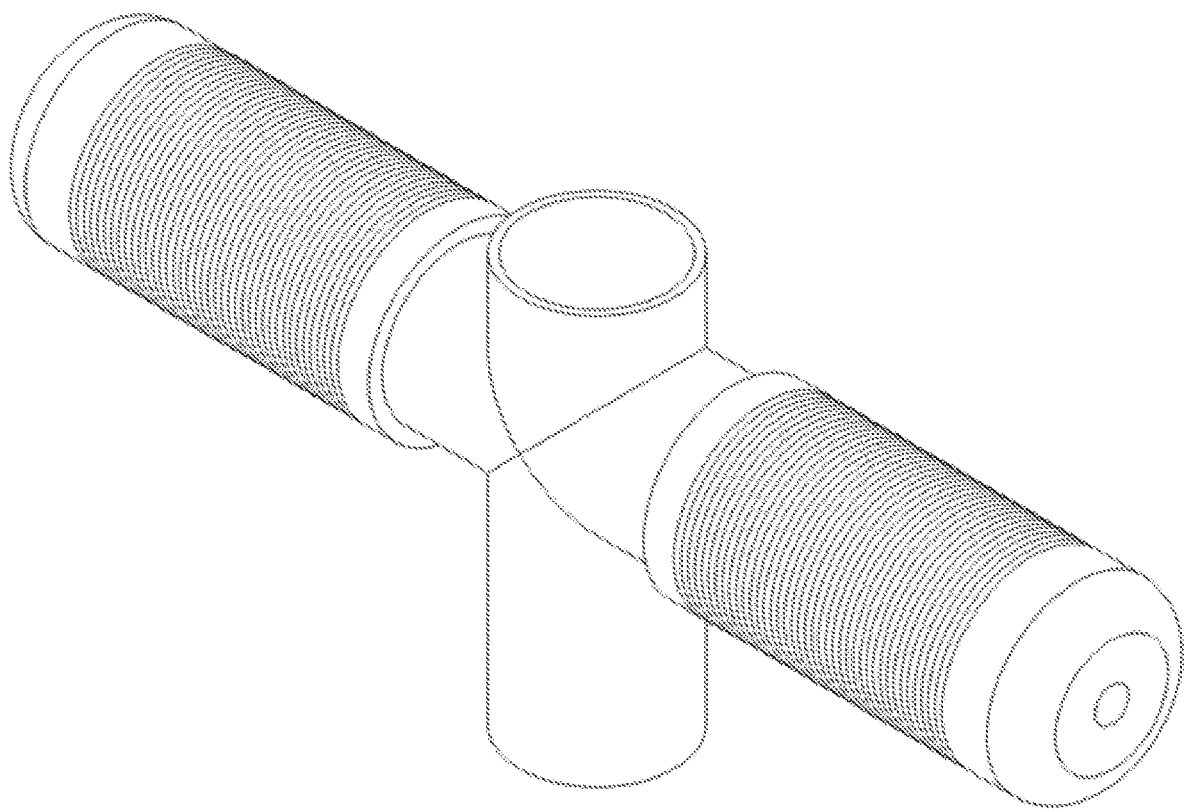
FIG. 29 illustrates a front right top perspective view of a swivel rotation handle (SRH) augmenting the vertical rotation handle (VRH) used in some preferred invention embodiments.
Figure 30:
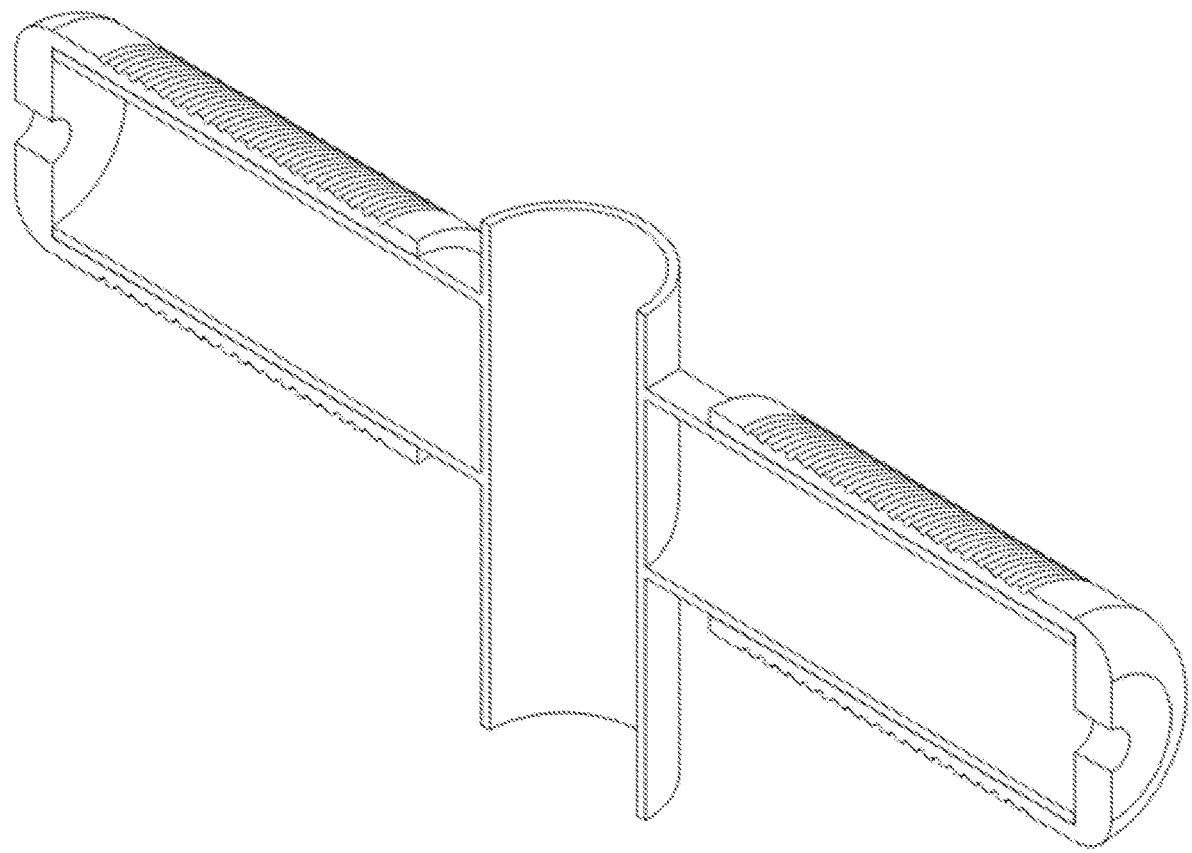
FIG. 30 illustrates a front right top perspective front section view of a swivel rotation handle (SRH) augmenting the vertical rotation handle (VRH) used in some preferred invention embodiments.
Figure 31:
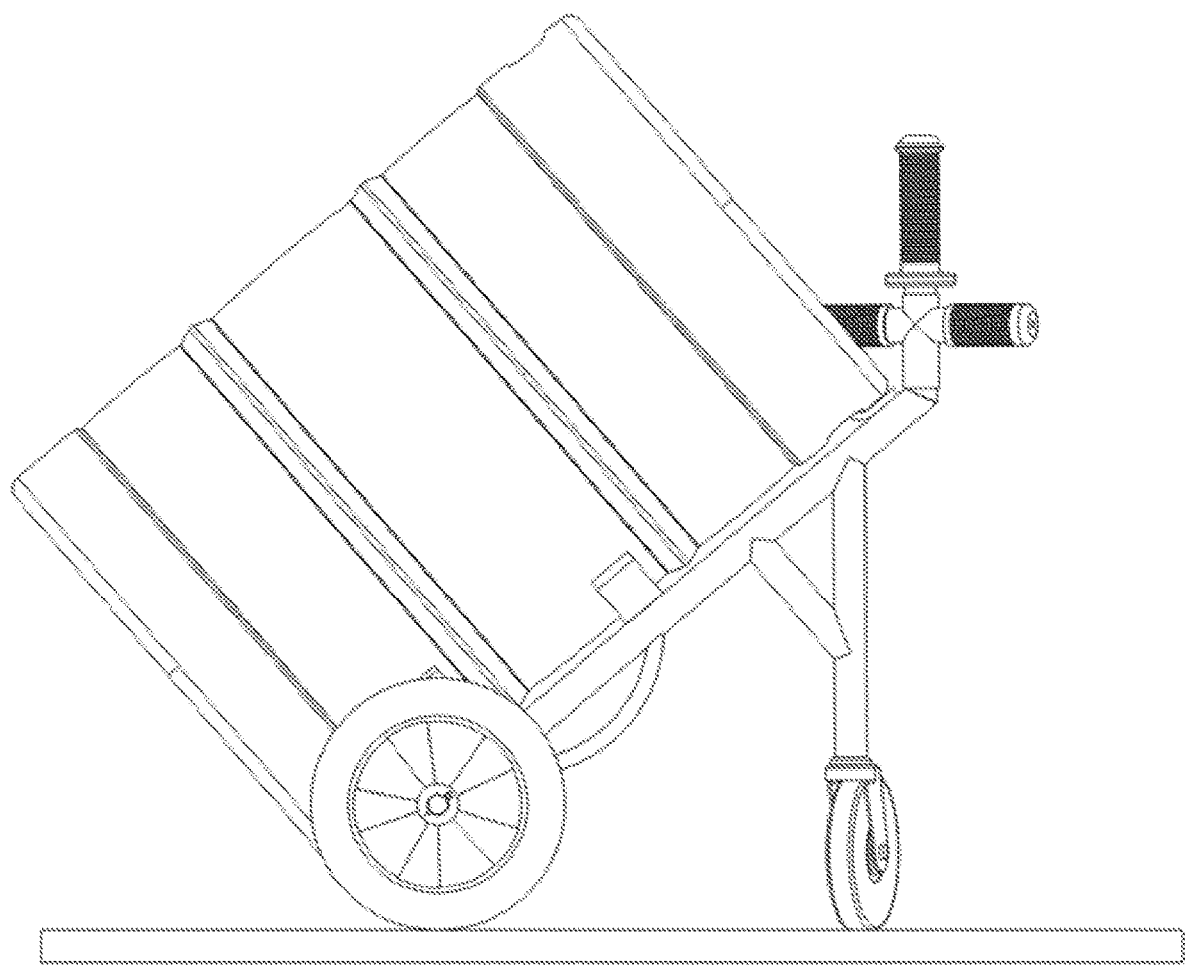
FIG. 31 illustrates a side view of a beverage keg dolly (BKD) and beverage keg (BK) combination being rotationally articulated using an exemplary swivel rotation handle (SRH)
Figure 32:
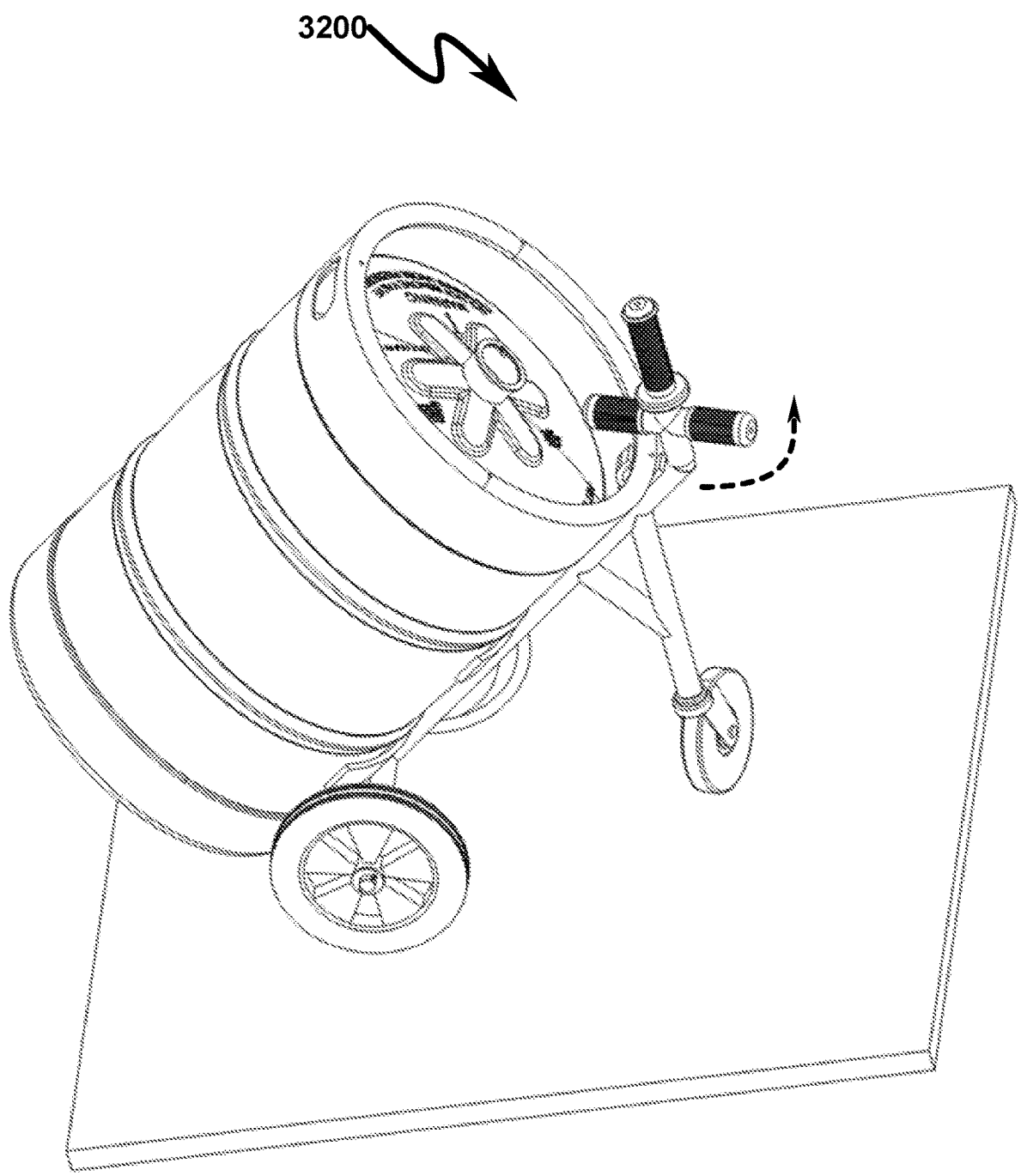
FIG. 32 illustrates a front right top perspective view of a beverage keg dolly (BKD) and beverage keg (BK) combination being rotationally articulated using an exemplary swivel rotation handle (SRH)

The vertical rotation handle (VRH) may be augmented with a swivel rotation handle (SRH) as generally depicted in FIG. 29 (2900)-FIG. 32 (3200) in some preferred invention embodiments. The SRH construction is generally depicted in the views of FIG. 29 (2900)-FIG. 30 (3000) and is designed to slide over and be retained by the VRH but allow for a T-handle structure to enable the operator to grab the SRH and articulate (rotate) around the VRH longitudinal axis to manipulate the orientation of the RWA as generally depicted in the views of FIG. 31 (3100)-FIG. 32 (3200). This allows the operator to maintain control of the BKD as it is rotated on the AWA and RWA. The SRH and VRH in conjunction allow the BKD to be manipulated when loaded with a BK in tight quarters where a conventional hand truck would be impossible to maneuver when loaded with a BK. Note that the operator in this case may be positioned at any point surrounding the BKD/BK combination and thus operate the BKD from side angles to allow the transportation of the BKD/BK in tight quarters such as behind a bar or around other restaurant furniture.

Note that the VRH and/or SRH may be covered with a rubberized and/or textured material covering to aid in gripping the VRH and/or SRH. One skilled in the art will recognize that this texturing may take the form of a surface covering material or in some circumstances may be implemented as a surface knurling on the body of the VRH and/or SRH.

Comparison to Prior Art (3300)-(4000)

Figure 33:
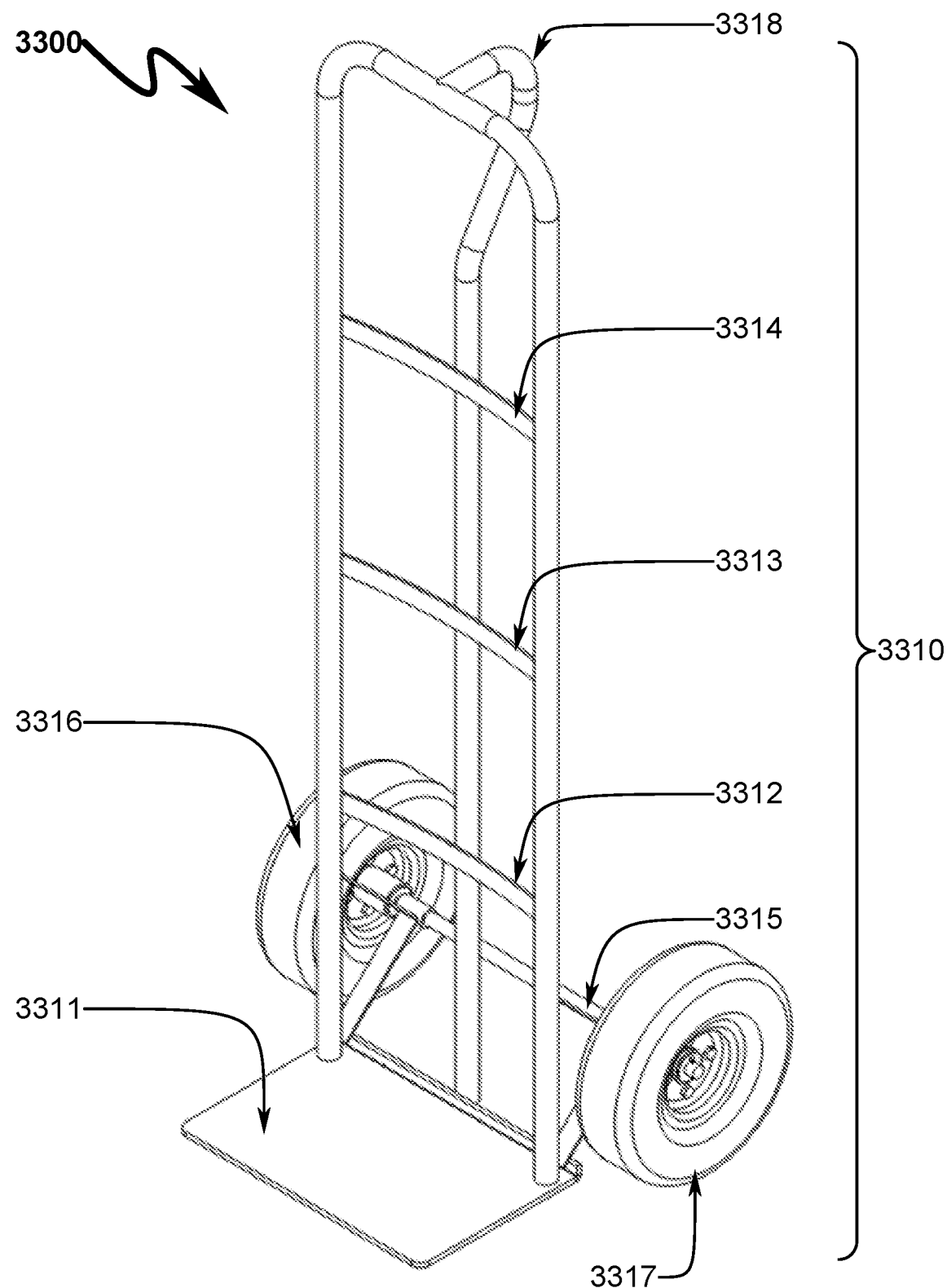
FIG. 33 illustrates a front right top perspective view of a prior art hand truck.

As generally depicted in FIG. 33 (3300), a conventional hand truck (3310) consists of a lifting tongue (3311) that is used to support the beverage keg and back rails (3312, 3313, 3314) that support the beverage keg when the hand truck (3310) is articulated about the wheel axle (3315) at which point the hand truck (3310) wheels (3316, 3317) support the beverage keg load as the operator maintains control of the hand truck grip (3318). It should be noted that with respect to hand trucks of this type the operator must maintain control of the hand truck grip (3318) when maneuvering the beverage keg on the hand truck.

Figure 34:
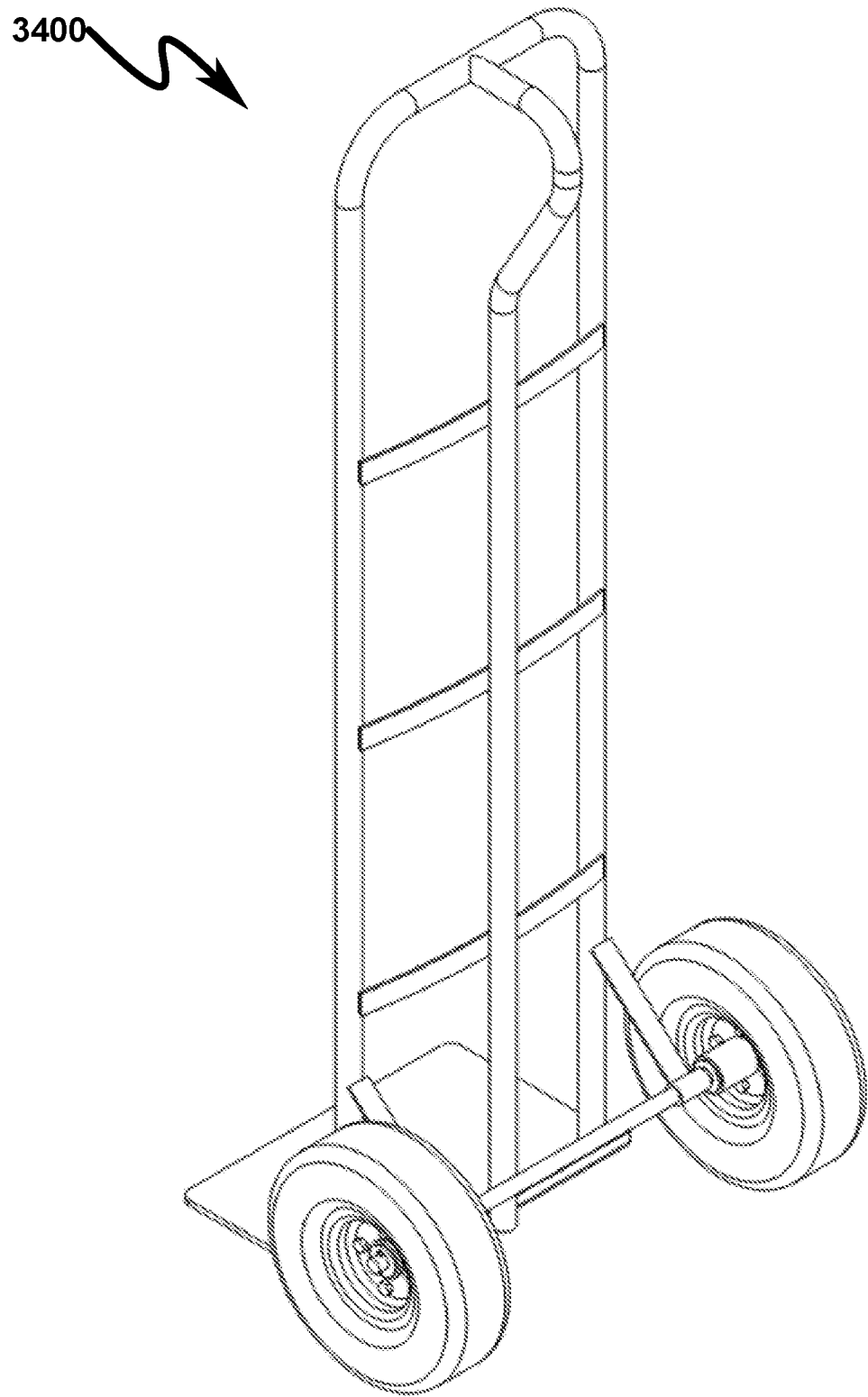
FIG. 34 illustrates a rear top right perspective view of a prior art hand truck.
Figure 35:
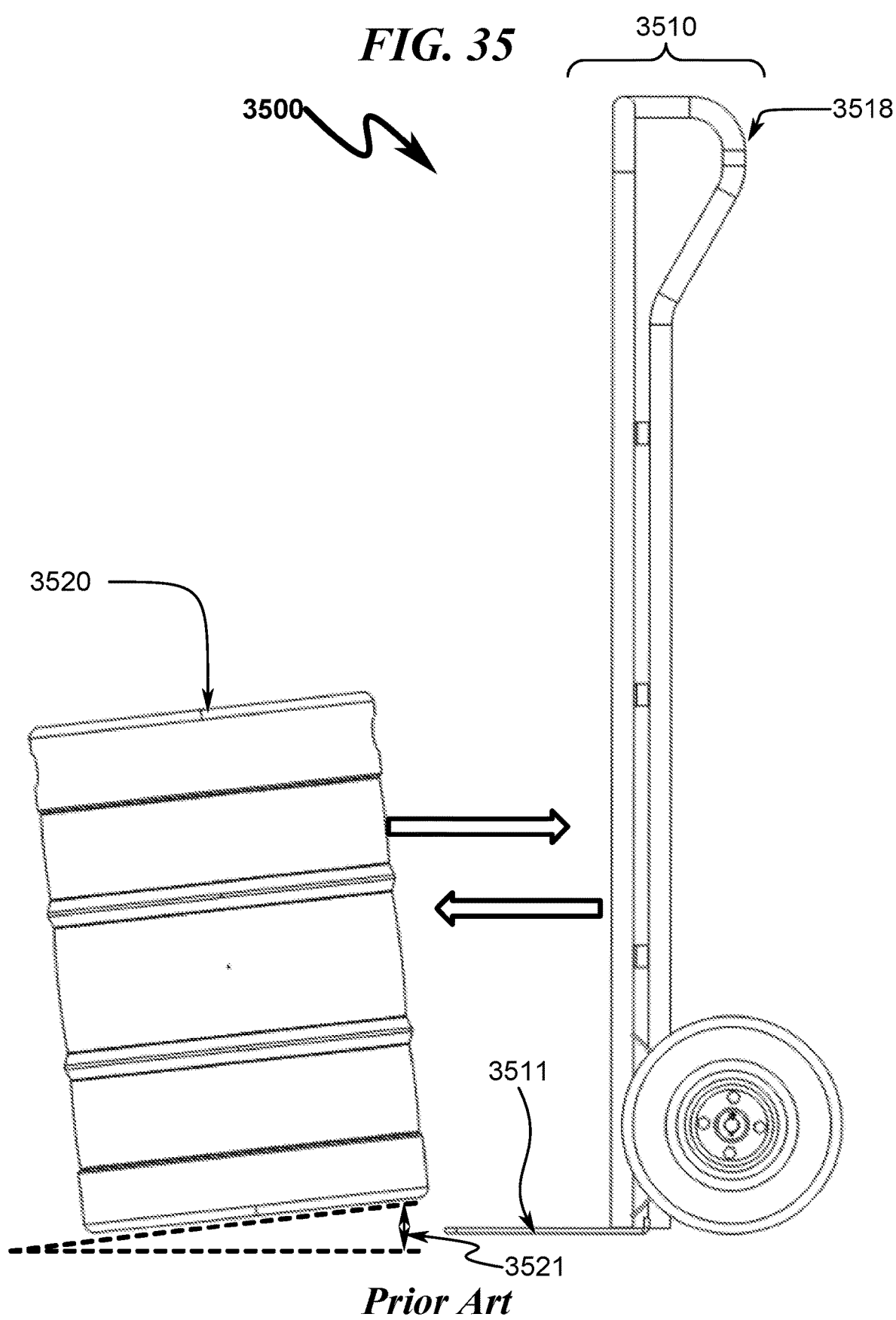
FIG. 35 illustrates a prior art hand truck positioned to engage a beverage keg.
Figure 36:
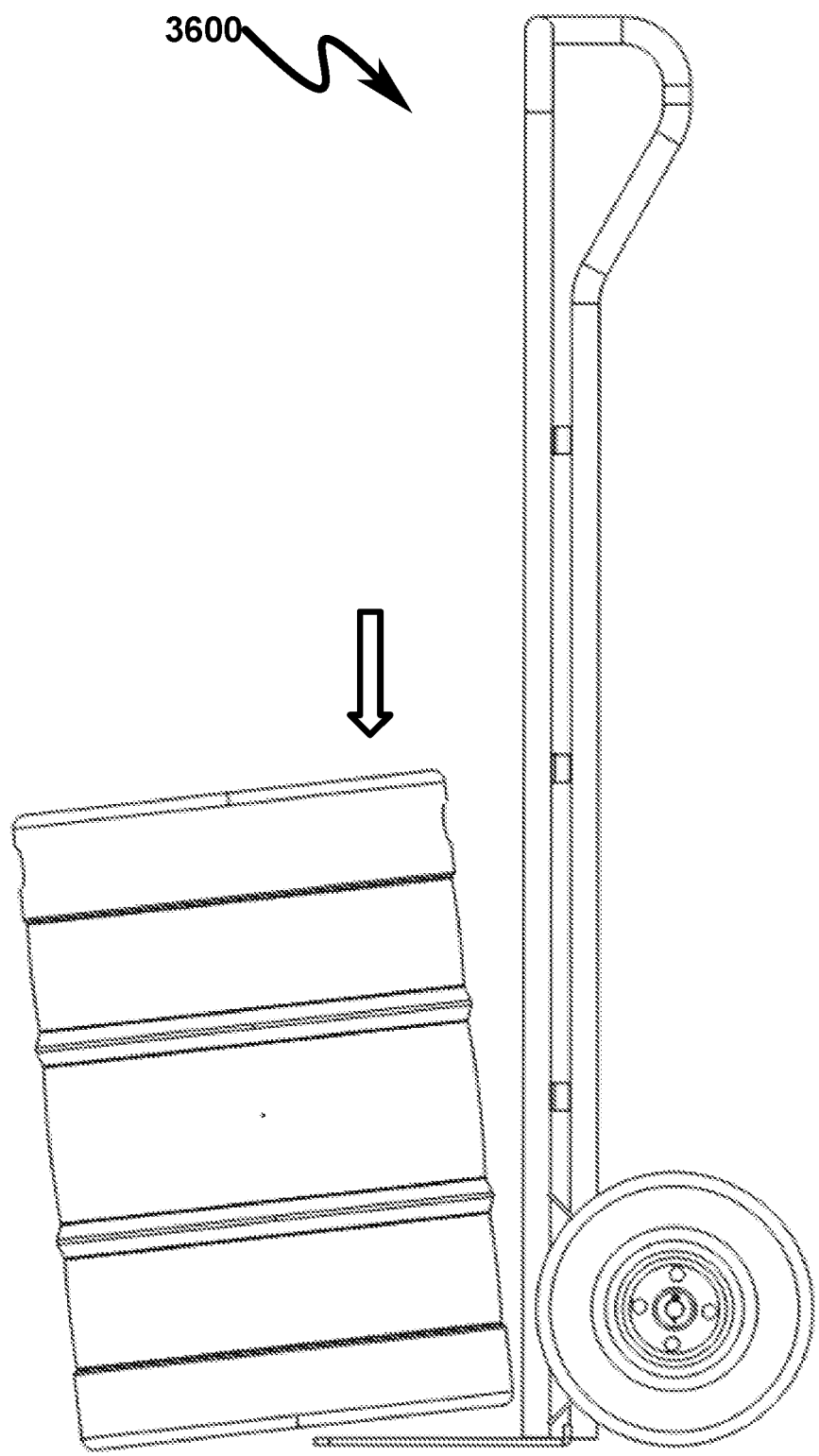
FIG. 36 illustrates a prior art hand truck engaging a beverage keg.
Figure 40:
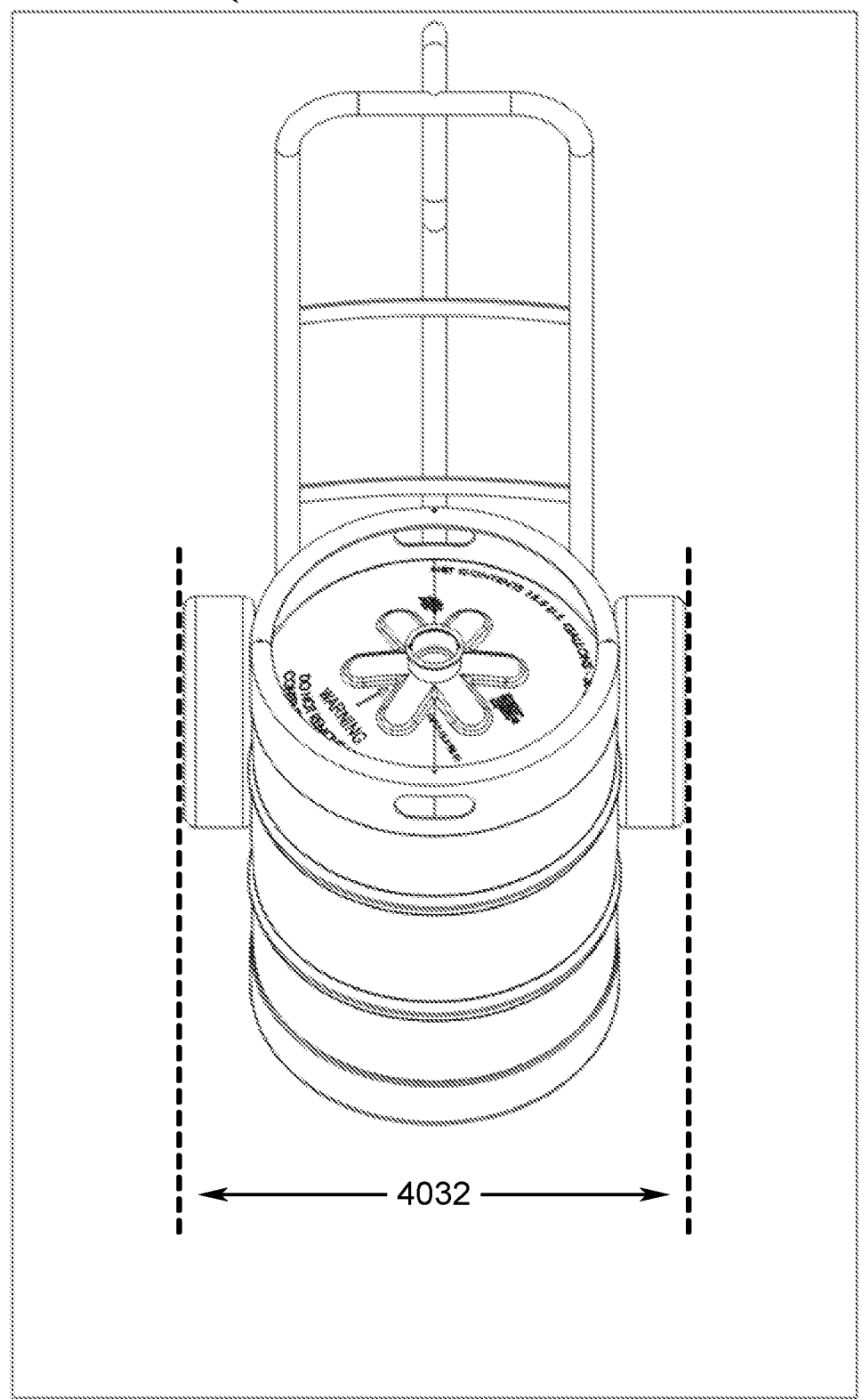
FIG. 40 illustrates a top view of a prior art hand truck engaging a beverage keg for transportation depicting the required lateral transport footprint.

The operation of the present invention will now be contrasted with that of the prior art hand truck as generally depicted in FIG. 33 (3300)-FIG. 40 (4000). Here it can be seen that a conventional hand truck (FIG. 33 (3300)-FIG. 34 (3400)) when used to transport a beverage keg (3520) as depicted in FIG. 35 (3500)-FIG. 40 (4000) differs from the present invention in several respects. First, as generally depicted in FIG. 35 (3500), the beverage keg (3520) must be tipped on edge (3521) to allow the lifting tongue (3511) of the hand truck (3510) to engage the bottom of the beverage keg (3520). This requires that the operator actually lift the beverage keg (3520) while manipulating the lifting tongue (3511) of the hand truck (3510) via the hand truck grip (3518) as generally depicted in FIG. 36 (3600) to engage the bottom of the beverage keg (3520), resulting in a possible back injury for the operator as this is both an awkward positioning maneuver as well as the lift of significant weight.

Figure 37:
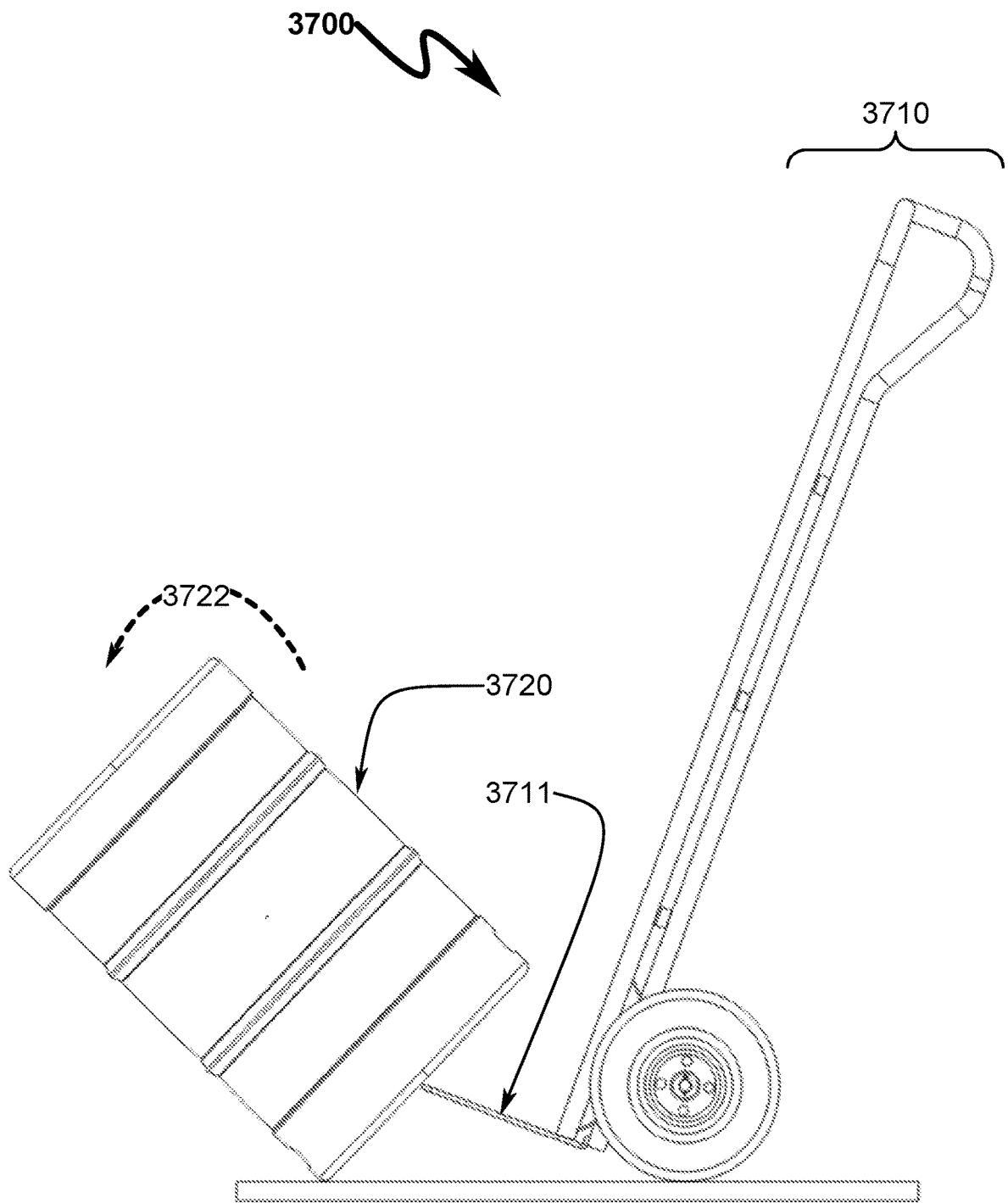
FIG. 37 illustrates a prior art hand truck engaging a beverage keg in a forward tipping failure.

Second, as generally depicted in FIG. 37 (3700), it is possible for the beverage keg (3720) to flip off (3722) forward of the lifting tongue (3711) of the hand truck (3710) if the lifting tongue (3711) is not fully engaged with the bottom of the beverage keg (3720) or if the lifting tongue (3711) is insufficiently long enough to extend beyond the vertical line of the center of gravity of the beverage keg (3720) as the beverage keg (3720) is being lifted by the hand truck (3710). This forward tipping failure (3722) can result in damage to the beverage keg (3720) or injury to the operator of the hand truck (3710). Note that this forward tipping failure (3722) may occur suddenly and is highly dependent on the axial positioning of the beverage keg (3720) on the lifting tongue (3711). This forward tipping failure (3722) may also occur suddenly as the wheels of the hand truck (3710) incur obstacles on the floor or changes in ground surface texture. It should be noted that extending the length of the lifting tongue (3711) may not completely solve this problem as it is possible for the hand truck (3710) to incur a ground obstacle that shifts the weight of the beverage keg (3720) forward and this creates a sudden and unexpected forward tipping failure (3722) of the beverage keg (3720). The use of straps or other retaining means to secure the beverage keg (3720) to the frame of the hand truck (3710) cannot completely solve this problem as it is prone to operator omission and thus there is no guarantee that the strap will be used in all circumstances of operation.

Figure 38:
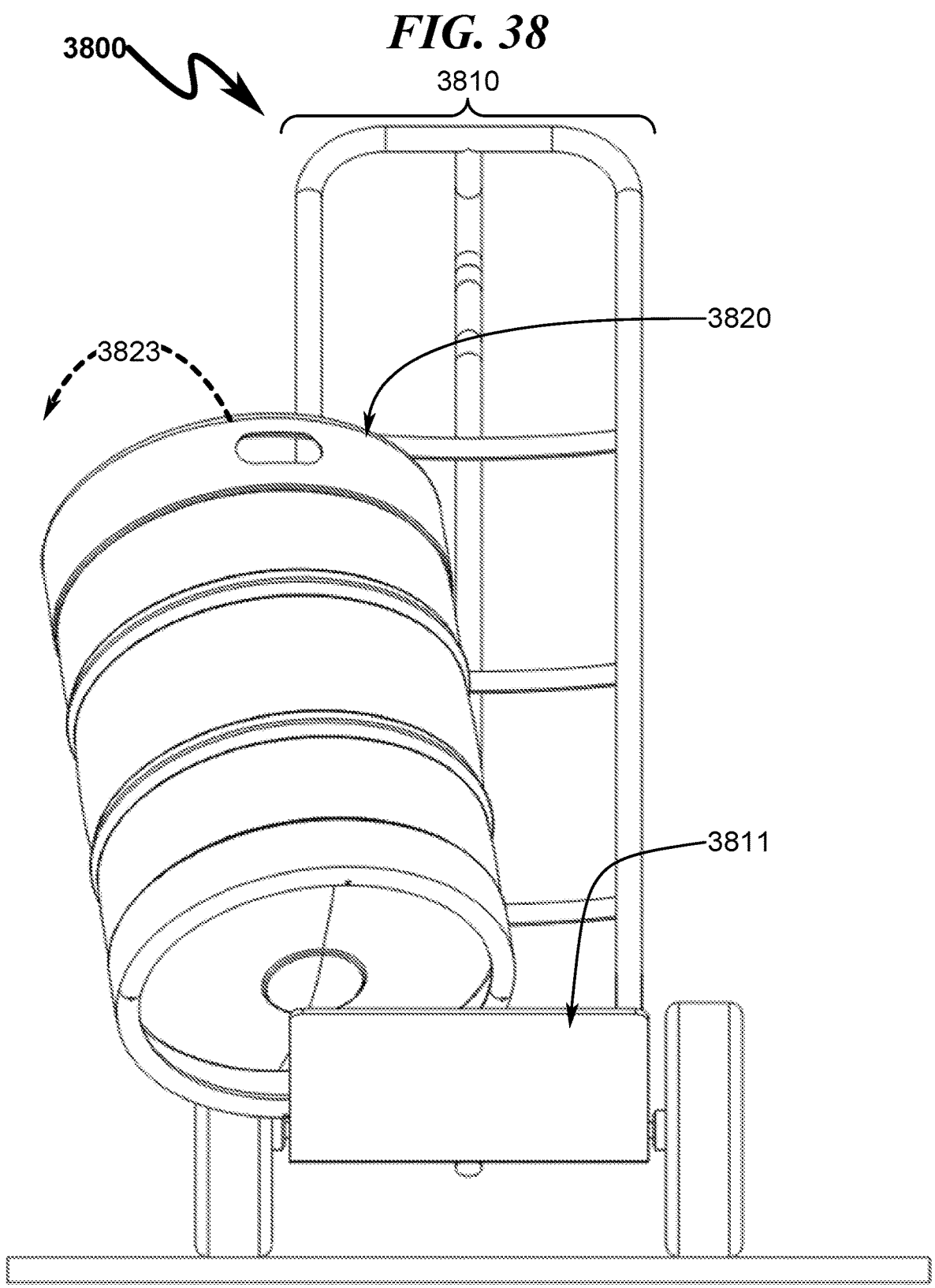
FIG. 38 illustrates a prior art hand truck engaging a beverage keg in a lateral tipping failure.

Third, as generally depicted in FIG. 38 (3800), it is possible for the beverage keg (3820) to flip off (3823) lateral of the lifting tongue (3811) of the hand truck (3810) if the lifting tongue (3611) is not fully engaged with the bottom of the beverage keg (3820) or if the beverage keg (3820) shifts laterally on the lifting tongue (3811) as the beverage keg (3820) is being lifted/transported by the hand truck (3810). This lateral tipping failure (3823) can occur unexpectedly as the hand truck (3810) is maneuvered in tight quarters, rotated to avoid obstacles, or if the beverage keg (3820) inadvertently hits an obstacle while in transport. This lateral tipping failure (3823) may also occur suddenly as the wheels of the hand truck (3810) incur obstacles on the floor or changes in ground surface texture. Again, straps or other similar securing means are not a guarantee that damage to the beverage keg (3820) or injury to the operator will not occur in these circumstances.

Figure 39:
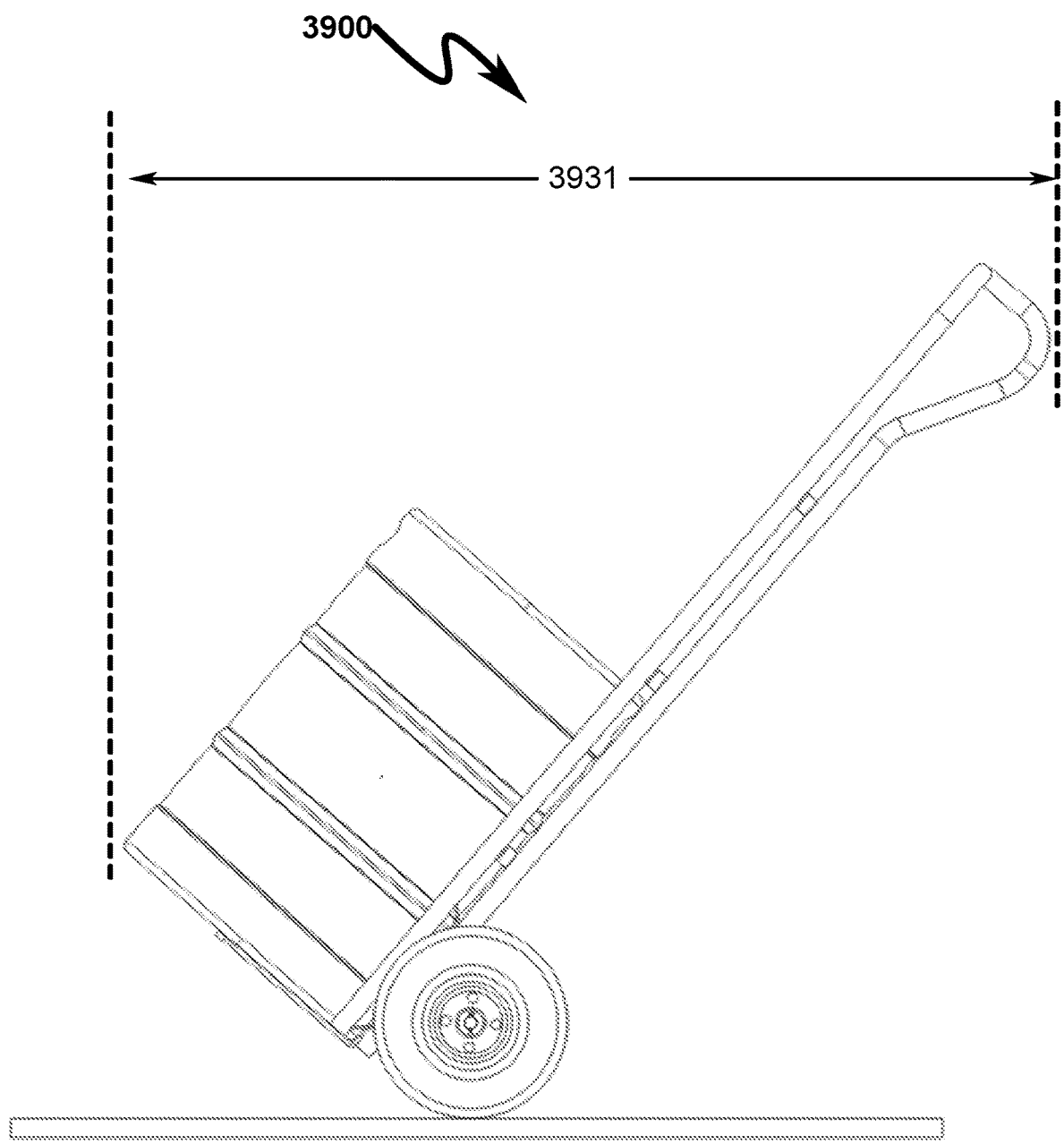
FIG. 39 illustrates a side view of a prior art hand truck engaging a beverage keg for transportation depicting the required horizontal transport footprint.

Fourth, as generally depicted in FIG. 39 (3900)-FIG. 40 (4000), the spatial footprint of the beverage keg when transported by the hand truck is significantly larger than the present invention both horizontally and laterally. As generally depicted in FIG. 39 (3900), the horizontal footprint (3931) of the hand truck when transporting the beverage keg extends well beyond twice the diameter of the beverage keg. This is necessary in order to provide the operator sufficient leverage with the hand truck to properly control the beverage keg when loaded on the hand truck. Similarly, as depicted in FIG. 40 (4000), the lateral footprint (4032) of the beverage keg when transported by the hand truck is significantly larger than that of the beverage keg alone. This is necessary as to maintain control of the hand truck with only two wheels in contact with the ground there is a need for additional safety margin in the lateral support of the beverage keg. In both of these instances the transportation footprint makes it difficult if not impossible to transport a beverage keg in tight quarters such as encountered in a bar or restaurant. It should be noted that simply reducing the height of the hand truck in these circumstances will not solve this problem as by shortening the hand truck height this requires the operator to exert additional effort to maintain the hand truck balance with the loaded beverage keg and this ultimately results in additional back strain for the operator. Given the height of a standard beverage keg (~2 ft), the lean-over strain using a hand truck of this height would be very uncomfortable and routinely unsafe for average height operators.

It is significant to note that the present invention cannot be used without engaging the keg engagement hook (KEH) (0150, 0250) with the BK. This is in contrast to conventional prior art hand trucks as depicted herein in that it is possible to transport a BK without properly securing the load to the hand truck with straps or other fastening means. The very design of the present invention ensures that the operator MUST engage the safety keg engagement hook (KEH) (0150, 0250) with the BK in order to lift and transport the BK. This means that there is no possibility of the BK tipping over or injuring the operator with the present invention as there is with the prior art. As an additional note, the present invention prevents accidental damage to the BK by eliminating tip-overs and other events in which a prior art hand truck would lose control of the BK.

System Summary

The present invention system may be broadly generalized as a beverage keg dolly (BKD) system consisting of:
(a) dolly frame spine (DFS);
(b) axial wheel assembly (ANA);
(c) radial wheel assembly (RWA);
(d) keg alignment handle (KAH);
(e) keg engagement hook (KEH);
(f) beverage keg cradle (BKC); and
(g) vertical rotation handle (VRH);
wherein:
the DFS consists of a tube having a first distal end and a second distal end;
the AWA consists of an axle connecting two wheels;
the axle is perpendicularly connected to the second distal end of the DFS at a midpoint of the axle;
the RWA consists of a caster wheel rotationally attached to a vertical support member (VSM) having a vertical distal end (VDE);
the VDE of the VSM is attached to the DFS at a first angle;
the KEH consists of a U-shaped hook connected to the side of the DFS proximal to the first distal end of the DFS;
the KAH consists of a member having two ends each of which is connected to the DFS;
the BKC consists of an arc-shaped member having an arc midpoint connected to the DFS;
the arc-shaped member defines a plane perpendicular to a longitudinal axis of the DFS;
the VRH consists of a vertical hand grip and tubular member; and
the tubular member is connected to the first distal end of the DFS at a second angle.

This general system summary may be augmented by the various elements described herein to produce a wide variety of invention embodiments consistent with this overall design description.

Method Summary

The present invention method may be broadly generalized as a beverage keg dolly (BFS) method consisting of:
(1) With a keg alignment handle (KAH) that is attached to a dolly frame spine (DFS), engaging a beverage keg (BK) with a keg engagement hook (KEH) attached to said DFS;
(2) With said KAH, cradling said BK within one or more beverage keg cradle (BKC) that are attached to said DFS while maintaining the engagement of said BK with said KEH;
(3) With an axial wheel assembly (AWA) attached to said DFS, supporting said BK by rotating said DFS about a longitudinal axis of said AWS;
(4) With a vertical rotation handle (VRH) attached to said DFS, rotating said DFS about said longitudinal axis of said AWS to lift said BK and transition a point of central gravity of said BK through a vertical equipoise plane (VEP) associated with a longitudinal axis of said AWS; and
(5) With a radial wheel assembly (RWA) that is attached to said DFS, supporting said BK as said point of central gravity of said BK continues to transition past said VEP.

This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

System/Method Variations

The present invention anticipates a wide variety of variations in the basic theme of construction. The examples presented previously do not represent the entire scope of possible usages. They are meant to cite a few of the almost limitless possibilities.

This basic system and method may be augmented with a variety of ancillary embodiments, including but not limited to:
An embodiment wherein the DFS and the VSM are connected with a radial wheel stabilizer (RWS).
An embodiment wherein the DFS tube has a length in the range of 16 inches to 24 inches.
An embodiment wherein the AWA axle has a length in the range of 12 inches to 18 inches.
An embodiment wherein the BKC arc-shaped member sweeps a cradle angle in the range of 90 degrees to 180 degrees.
An embodiment wherein the BKC arc-shaped member has a radius in the range of 7 inches to 12 inches.
An embodiment wherein the KAH consists of an arc-shaped member connected to the DFS.
An embodiment wherein the first angle is in the range of 45 degrees to 55 degrees.
An embodiment wherein the second angle is in the range of 45 degrees to 55 degrees.
An embodiment wherein the first angle and the second angle are identical.
An embodiment wherein the AWA consists of 6-inch diameter wheels and the RWA consists of a 5-inch diameter wheel.

One skilled in the art will recognize that other embodiments are possible based on combinations of elements taught within the above invention description.

CONCLUSION

A beverage keg dolly (BKD) system/method providing for transportation of a beverage keg (BK) in tight quarters has been disclosed. The system/method integrates a dolly frame spine (DFS), axial wheel assembly (AWA), radial wheel assembly (RWA), keg alignment handle (KAH), keg engagement hook (KEH), beverage keg cradle (BKC), and vertical rotation handle (VRH). BK transportation uses the KAH to engage/cradle the KEH to a BK within the BKC. Once cradled by the BKC, the BK is lifted off the ground and supported by the AWA via depression of the VRH. The BK axially rotates about the AWA by the VRH until the BK center of gravity transitions a vertical equipoise plane (VEP) extending from the AWA. The weight of the BK is then supported by the AWA and the RWA. Transportation and/or circular rotation of the BK may then be affected by rotation/movement of the VRH.

CLAIMS INTERPRETATION

The following rules apply when interpreting the CLAIMS of the present invention:
The CLAIM PREAMBLE should be considered as limiting the scope of the claimed invention.
"WHEREIN" clauses should be considered as limiting the scope of the claimed invention.
"WHEREBY" clauses should be considered as limiting the scope of the claimed invention.
"ADAPTED TO" clauses should be considered as limiting the scope of the claimed invention.
"ADAPTED FOR" clauses should be considered as limiting the scope of the claimed invention.
The team "MEANS" specifically invokes the means-plus-function claims limitation recited in 35 U.S.C. § 112(f) and such claim shall be construed to cover the corresponding structure, material, or acts described in the specification and equivalents thereof.
The phrase "MEANS FOR" specifically invokes the means-plus-function claims limitation recited in 35 U.S.C. § 112(f) and such claim shall be construed to cover the corresponding structure, material, or acts described in the specification and equivalents thereof.
The phrase "STEP FOR" specifically invokes the step-plus-function claims limitation recited in 35 U.S.C. § 112(f) and such claim shall be construed to cover the corresponding structure, material, or acts described in the specification and equivalents thereof.
The step-plus-function claims limitation recited in 35 U.S.C. § 112(f) shall be construed to cover the corresponding structure, material, or acts described in the specification and equivalents thereof ONLY for such claims including the phrases "MEANS FOR", "MEANS", or "STEP FOR".
The phrase "AND/OR" in the context of an expression "X and/or Y" should be interpreted to define the set of "(X and Y)" in union with the set "(X or Y)" as interpreted by Ex Parte Gross (USPTO Patent Trial and Appeal Board, Appeal 2011-004811, Ser. No. 11/565,411, ("'and/or' covers embodiments having element A alone, B alone, or elements A and B taken together").

The claims presented herein are to be interpreted in light of the specification and drawings presented herein with sufficiently narrow scope such as to not preempt any abstract idea.

The claims presented herein are to be interpreted in light of the specification and drawings presented herein with sufficiently narrow scope such as to not preclude every application of any idea.

The claims presented herein are to be interpreted in light of the specification and drawings presented herein with sufficiently narrow scope such as to preclude any basic mental process that could be performed entirely in the human mind.

The claims presented herein are to be interpreted in light of the specification and drawings presented herein with sufficiently narrow scope such as to preclude any process that could be performed entirely by human manual effort.

What is claimed is:

1. A beverage keg dolly (BKD) system consisting of:
   (a) dolly frame spine (DFS);
   (b) axial wheel assembly (AWA);
   (c) radial wheel assembly (RWA);
   (d) keg alignment handle (KAH);
   (e) keg engagement hook (KEH);
   (f) beverage keg cradle (BKC); and
   (g) vertical rotation handle (VRH);
   wherein:
   said DFS consists of a tube having a first distal end and a second distal end;
   said AWA consists of an axle connecting two wheels;
   said axle is perpendicularly connected to said second distal end of said DFS at a midpoint of said axle;
   said RWA consists of a caster wheel rotationally attached to a vertical support member (VSM) having a vertical distal end (VDE);
   said VDE of said VSM is attached to said DFS at a first angle;
   said KEH consists of a U-shaped hook connected to the side of said DFS proximal to said first distal end of said DFS;
   said KAH consists of a member having two ends each of which is connected to said DFS;
   said BKC consists of an arc-shaped member having an arc midpoint connected to said DFS;
   said arc-shaped member defines a plane perpendicular to a longitudinal axis of said DFS;
   said VRH consists of a vertical hand grip and tubular member; and
   said tubular member is connected to said first distal end of said DFS at a second angle.

2. The beverage keg dolly system of claim 1 wherein said DFS tube has a length in the range of 16 inches to 24 inches.

3. The beverage keg dolly system of claim 1 wherein said AWA axle has a length in the range of 12 inches to 18 inches.

4. The beverage keg dolly system of claim 1 wherein said BKC arc-shaped member sweeps a cradle angle in the range of 90 degrees to 180 degrees.

5. The beverage keg dolly system of claim 1 wherein said BKC arc-shaped member has a radius in the range of 7 inches to 12 inches.

6. The beverage keg dolly system of claim 1 wherein said KAH consists of an arc-shaped member connected to said DFS.

7. The beverage keg dolly system of claim 1 wherein said first angle is in the range of 45 degrees to 55 degrees.

8. The beverage keg dolly system of claim 1 wherein said second angle is in the range of 45 degrees to 55 degrees.

9. The beverage keg dolly system of claim 1 wherein said first angle and said second angle are identical.

10. The beverage keg dolly system of claim 1 wherein said AWA consists of 6-inch diameter wheels and said RWA consists of a 5-inch diameter wheel.

11. A beverage keg dolly (BKD) system consisting of:
    (a) dolly frame spine (DFS);
    (b) axial wheel assembly (ANA);
    (c) radial wheel assembly (RWA);
    (d) keg alignment handle (KAH);
    (e) keg engagement hook (KEH);
    (f) beverage keg cradle (BKC);
    (g) vertical rotation handle (VRH); and
    (h) radial wheel stabilizer (RWS)
    wherein:
    said DFS consists of a tube having a first distal end and a second distal end;
    said AWA consists of an axle connecting two wheels;
    said axle is perpendicularly connected to said second distal end of said DFS at a midpoint of said axle;
    said RWA consists of a caster wheel rotationally attached to a vertical support member (VSM) having a vertical distal end (VDE);
    said VDE of said VSM is attached to said DFS at a first angle;
    said KEH consists of a U-shaped hook connected to the side of said DFS proximal to said first distal end of said DFS;
    said KAH consists of a member having two ends each of which is connected to said DFS;
    said BKC consists of an arc-shaped member having an arc midpoint connected to said DFS;
    said arc-shaped member defines a plane perpendicular to a longitudinal axis of said DFS;
    said VRH consists of a vertical hand grip and tubular member;
    said tubular member is connected to said first distal end of said DFS at a second angle; and
    said DFS and said VSM are connected with said radial wheel stabilizer (RWS).

12. The beverage keg dolly system of claim 11 wherein said DFS tube has a length in the range of 16 inches to 24 inches.

13. The beverage keg dolly system of claim 11 wherein said AWA axle has a length in the range of 12 inches to 18 inches.

14. The beverage keg dolly system of claim 11 wherein said BKC arc-shaped member sweeps a cradle angle in the range of 90 degrees to 180 degrees.

15. The beverage keg dolly system of claim 11 wherein said BKC arc-shaped member has a radius in the range of 7 inches to 12 inches.

16. The beverage keg dolly system of claim 11 wherein said KAH consists of an arc-shaped member connected to said DFS.

17. The beverage keg dolly system of claim 11 wherein said first angle is in the range of 45 degrees to 55 degrees.

18. The beverage keg dolly system of claim 11 wherein said second angle is in the range of 45 degrees to 55 degrees.

19. The beverage keg dolly system of claim 11 wherein said first angle and said second angle are identical.

20. A beverage keg dolly (BKD) method consisting of:
(1) With a keg alignment handle (KAH) that is attached to a dolly frame spine (DFS), engaging a beverage keg (BK) with a keg engagement hook (KEH) attached to said DFS;
(2) With said KAH, cradling said BK within one or more beverage keg cradle (BKC) that are attached to said DFS while maintaining the engagement of said BK with said KEH;
(3) With an axial wheel assembly (AWA) attached to said DFS, supporting said BK by rotating said DFS about a longitudinal axis of said AWS;
(4) With a vertical rotation handle (VRH) attached to said DFS, rotating said DFS about said longitudinal axis of said AWS to lift said BK and transition a point of central gravity of said BK through a vertical equipoise plane (VEP) associated with a longitudinal axis of said AWS; and
(5) With a radial wheel assembly (RWA) that is attached to said DFS, supporting said BK as said point of central gravity of said BK continues to transition past said VEP.

* * * * *